(12) United States Patent
Karamcheti et al.

(10) Patent No.: US 8,266,407 B2
(45) Date of Patent: *Sep. 11, 2012

(54) WRITING TO ASYMMETRIC MEMORY

(75) Inventors: Vijay Karamcheti, Los Altos, CA (US);
Kenneth A. Okin, Saratoga, CA (US);
Kumar Ganapathy, Los Altos, CA
(US); Ashish Singhai, Cupertino, CA
(US); Rajesh Parekh, Los Altos, CA
(US)

(73) Assignee: Virident Systems Inc., Milpitas, CA
(US)

( * ) Notice: Subject to any disclaimer, the term of this
patent is extended or adjusted under 35
U.S.C. 154(b) by 0 days.

This patent is subject to a terminal disclaimer.

(21) Appl. No.: 13/053,371

(22) Filed: Mar. 22, 2011

(65) Prior Publication Data

US 2011/0173371 A1 Jul. 14, 2011

Related U.S. Application Data

(63) Continuation of application No. 11/935,281, filed on Nov. 5, 2007, now Pat. No. 7,930,513.

(60) Provisional application No. 60/864,399, filed on Nov. 4, 2006.

(51) Int. Cl.
*G06F 12/00* (2006.01)

(52) U.S. Cl. ........ 711/203; 711/101; 711/103; 711/146; 711/170

(58) Field of Classification Search .................. 711/101, 711/103, 146, 170, 203
See application file for complete search history.

(56) References Cited

U.S. PATENT DOCUMENTS

| | | | |
|---|---|---|---|
| 4,757,533 A | 7/1988 | Allen et al. | |
| 5,012,408 A | 4/1991 | Conroy | |
| 5,404,485 A | 4/1995 | Ban | |
| 6,393,545 B1 | 5/2002 | Long et al. | |
| 6,549,959 B1 | 4/2003 | Yates et al. | |
| 6,564,326 B2 | 5/2003 | Helbig | |
| 6,970,968 B1 | 11/2005 | Holman | |
| 7,761,623 B2 * | 7/2010 | Karamcheti et al. | 710/62 |
| 7,761,624 B2 * | 7/2010 | Karamcheti et al. | 710/62 |
| 7,761,625 B2 * | 7/2010 | Karamcheti et al. | 710/62 |
| 7,761,626 B2 * | 7/2010 | Karamcheti et al. | 710/62 |

(Continued)

OTHER PUBLICATIONS

Lee, H.G., and Chang, N., "Energy-Aware Memory Allocation in Heterogeneous Non-Volatile Memory Systems," Low Power Electronics and Design, Aug. 2003, retrieved from http://ieeexplore.ieee.org/iel5/8720/27594/01231941.pdf?tp=&isnumber=&arnumber=12394> on May 1, 2008.

(Continued)

*Primary Examiner* — Reba I Elmore
(74) *Attorney, Agent, or Firm* — Fish & Richardson P.C.

(57) ABSTRACT

A memory controller writes to a virtual address associated with data residing within an asymmetric memory component of main memory that is within a computer system and that has a symmetric memory component, while preserving proximate other data residing within the asymmetric memory component. The symmetric memory component within the main memory of the computer system is configured to enable random access write operations in which an address within a block of the symmetric memory component is written without affecting the availability of other addresses within the block of the symmetric memory component during the writing of that address. The asymmetric memory component is configured to enable block write operations in which writing to an address within a region of the asymmetric memory component affects the availability of other addresses within the region of the asymmetric memory component during the block write operations involving the address.

20 Claims, 21 Drawing Sheets

U.S. PATENT DOCUMENTS

| | | | |
|---|---|---|---|
| 7,774,556 B2 * | 8/2010 | Karamcheti et al. | 711/146 |
| 7,818,489 B2 * | 10/2010 | Karamcheti et al. | 711/101 |
| 7,913,055 B2 * | 3/2011 | Karamcheti et al. | 711/203 |
| 7,930,513 B2 * | 4/2011 | Karamcheti et al. | 711/203 |
| 2002/0051350 A1 | 5/2002 | Take | |
| 2002/0118593 A1 | 8/2002 | Takemae | |
| 2002/0133684 A1 | 9/2002 | Anderson | |
| 2002/0138600 A1 | 9/2002 | Singhal | |
| 2003/0137862 A1 | 7/2003 | Brunelle et al. | |
| 2003/0188083 A1 | 10/2003 | Kumar et al. | |
| 2004/0117581 A1 | 6/2004 | Lee | |
| 2004/0160835 A1 | 8/2004 | Altman et al. | |
| 2004/0186948 A1 | 9/2004 | Lofgren et al. | |
| 2004/0193783 A1 | 9/2004 | Sharma et al. | |
| 2005/0044303 A1 | 2/2005 | Perego et al. | |
| 2005/0166026 A1 | 7/2005 | Ware et al. | |
| 2005/0235131 A1 | 10/2005 | Ware | |
| 2005/0240745 A1 | 10/2005 | Iyer et al. | |
| 2005/0251617 A1 | 11/2005 | Sinclair et al. | |
| 2005/0273570 A1 | 12/2005 | DeSouter et al. | |
| 2005/0289317 A1 | 12/2005 | Liou et al. | |
| 2006/0106984 A1 | 5/2006 | Bartley et al. | |
| 2006/0149857 A1 | 7/2006 | Holman | |
| 2006/0230250 A1 | 10/2006 | Klint et al. | |
| 2007/0300038 A1 | 12/2007 | Ware | |
| 2009/0106478 A1 * | 4/2009 | Okin et al. | 711/1 |
| 2009/0157989 A1 * | 6/2009 | Karamcheti et al. | 711/156 |
| 2010/0325383 A1 * | 12/2010 | Karamcheti et al. | 711/203 |
| 2011/0022788 A1 * | 1/2011 | Karamcheti et al. | 711/103 |

OTHER PUBLICATIONS

Tseng, H.W., et al., "An Energy-Efficient Virtual Memory System with Flash Memory as the Secondary Storage," Low Power Electronics and Design, Oct. 4-6, 2006, retrieved from http://ieeexplore.ieee.org/xpls/abs_all.jsp?arnumber=4271879> on May 1, 2008.

International Search Report and Written Opinion for International Application No. PCT/US07/83669, dated Apr. 30, 2008, 9 pages.

International Search Report and Written Opinion for International Application No. PCT/US07/83671, dated May 22, 2008, 14 pages.

International Search Report and Written Opinion for International Application No. PCT/US07/83668, dated May 15, 2008, 8 pages.

International Search Report and Written Opinion for International Application No. PCT/US07/83666, dated Apr. 21, 2008, 9 pages.

International Search Report and Written Opinion for International Application No. PCT/US07/79622, dated Apr. 9, 2008, 12 pages.

Office Action for U.S. Appl. No. 11/864,763, mailed Jun. 16, 2008, 11 pages.

International Search Report and Written Opinion for International Application No. PCT/US07/80015, dated Aug. 13, 2008, 13 pages.

U.S. Notice of Allowance for U.S. Appl. No. 11/935,281 dated Dec. 17, 2010, 4 pages.

* cited by examiner

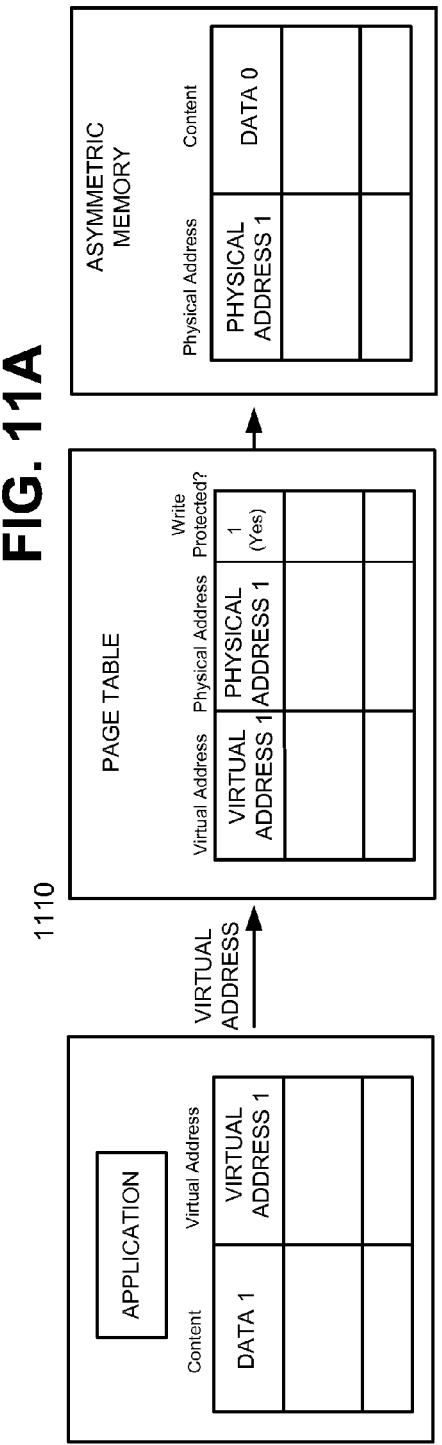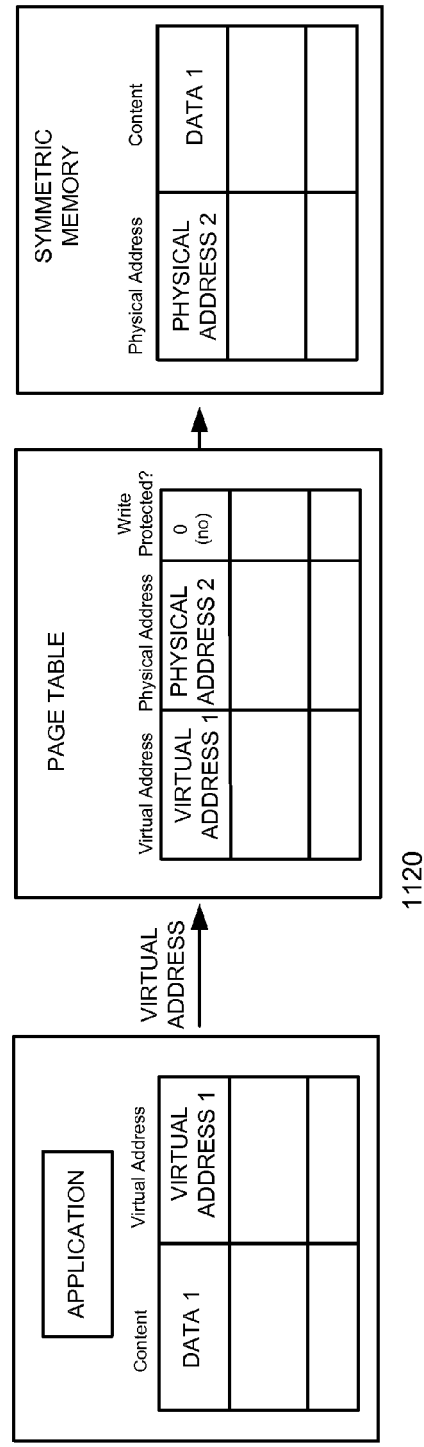
FIG. 11A
FIG. 11B

1500

The memory table is configured to associate other data stored in a same page as the data and residing within the asymmetric memory component with physical addresses of the asymmetric memory component
(1510)

↓

The memory controller determines that the data is to be written in the symmetric memory component based on a relationship between the data to be written and the other data residing within the asymmetric memory component
(1520)

↓

The memory controller writes the other data to the symmetric memory component of the main memory within the computer system
(1530)

↓

The memory map is configured to map other virtual addresses associated with the other data to the symmetric memory component addresses data residing within the asymmetric memory component
(1540)

↓

A second read request is received
(1550)

↓

Based on the memory map, the memory controller determines that the second read request is associated with the one or more of the other virtual addresses mapped by the memory map to corresponding symmetric memory component addresses
(1560)

↓

In satisfaction of the second read request and based on determining that the second read request is associated with one or more of the other virtual addresses mapped to the symmetric memory component, the memory controller enables access to the other data within the symmetric memory component of the main memory within the computer system
(1570)

FIG. 15

WRITING TO ASYMMETRIC MEMORY

CROSS-REFERENCE TO RELATED APPLICATIONS

This application is a continuation application of and claims priority to U.S. application Ser. No. 11/935,281, filed on Nov. 5, 2007, now allowed, which claims the benefit to U.S. Provisional Application No. 60/864,399, filed on Nov. 4, 2006. Both of these prior applications are incorporated by reference in their entirety.

TECHNICAL FIELD

This document relates to the configuration and use of main memory, including symmetric and asymmetric memory components, within a computer system.

BACKGROUND

Main memory is memory that is accessible to a central processing unit ("CPU") of a computer or electronic device. Main memory is used to store data that is deemed likely to be actively used by the CPU.

SUMMARY

In one aspect, writes are performed to a virtual address associated with data residing within an asymmetric memory component of main memory that is within a computer system and that has a symmetric memory component while preserving proximate other data residing within the asymmetric memory component and enabling access to the proximate other data and the update upon receipt of a read request related to the data. The symmetric memory component within the main memory of the computer system is configured to enable random access write operations in which an address within a block of the symmetric memory component is written without affecting the availability of other addresses within the block of the symmetric memory component during the writing of that address. The asymmetric memory component is configured to enable block write operations in which writing to an address within a region of the asymmetric memory component affects the availability of other addresses within the region of the asymmetric memory component during the block write operations involving the address.

A command is received on a central processing unit from an application to write data to the main memory within the computer system. It is determined that the data is to be written to an asymmetric memory component of the main memory within the computer system. Despite determining that the data is to be written to the asymmetric memory component of the main memory within the computer system, a memory table is configured to associate the data with a physical address within a symmetric memory component of the main memory instead of the asymmetric memory component of the main memory within the computer system.

The data is written using a random access write operation to the physical address for the symmetric memory component of the main memory within the computer system. A memory map is configured to map the physical address of the symmetric memory component to which the data is written to a first virtual address. A first read request is received, and, based on the memory map, it is determined that the first read request is associated with the first virtual address that is mapped to the symmetric memory component of the main memory within the computer system. In satisfaction of the first read request, and based on determining that the first read request is associated with the first virtual address that is mapped to the symmetric memory component of the main memory within the computer system, access to the data associated with virtual address within the symmetric memory component of the main memory within the computer system is enabled.

Implementations may include one or more of the following features. For example, the asymmetric memory component of main memory includes NOR flash and the symmetric memory component may include dynamic random access memory (DRAM) and the memory controller also may receive a command to write the data to the main memory within the computer system. It is determined that the data is to be written to NOR flash. Despite determining that the data is to be written to the NOR flash, the memory table is configured to associate the data with a DRAM physical address instead of the NOR flash.

Using a random access write operation, the data is written to the DRAM physical address for the DRAM. The memory map is configured to map the DRAM physical address to which the data is written to the first virtual address. The first read request is received and, based on the memory map, it is determined that the first read request is associated with the first virtual address that is mapped to the DRAM. In satisfaction of the first read request, and based on determining that the first read request is associated with the virtual address that is mapped to the DRAM, access to the data associated with first virtual address within the DRAM is enabled.

The asymmetric memory component has asymmetric access characteristics that may include (1) the asymmetric memory component performs read operations at a first rate and performs write operations at a second rate that is more than an order of magnitude different than the first rate, (2) the asymmetric memory component uses an asymmetric memory access protocol, and (3) the asymmetric memory component includes non-volatile storage capability. The symmetric memory component has symmetric access characteristics that may include (1) the symmetric memory component performs read operations at a rate that that differs by less than an order of magnitude from a rate at which write operations are performed, (2) the symmetric memory component uses a symmetric memory access protocol, and (3) the symmetric memory component includes a volatile storage capability.

Receiving the command from the application may include receiving the command to write to a second virtual address, and the memory controller also may detect a write protection parameter for the second virtual address and use the write protection parameter to configure the memory table to associate the data with a physical address within the symmetric memory component of the main memory instead of the asymmetric memory component of the main memory within the computer system.

The first virtual address and the second virtual address may be the same. Detecting the write protection parameter for the second virtual address may include referencing a record for an asymmetric memory physical address, detecting a write protection bit for the asymmetric memory physical address, and using detection of the write protection bit to adjust the memory map to map the second virtual address to the symmetric memory component of the main memory instead of the asymmetric memory component of the main memory within the computer system.

The memory table may be configured to associate other data stored in a same page as the data and residing within the asymmetric memory component with physical addresses of the asymmetric memory component, determine that the data is to be written in the symmetric memory component based on a relationship between the data to be written and the other data residing within the asymmetric memory component write the other data to the symmetric memory component of the main memory within the computer system, configure the memory map to map other virtual addresses associated with the other data to the symmetric memory component addresses of data residing within the asymmetric memory component, receive a second read request, determine, based on the memory map, that the second read request is associated with the one or more of the other virtual addresses mapped by the memory map to corresponding symmetric memory component addresses, and, in satisfaction of the second read request and based on determining that the second read request is associated with one or more of the other virtual addresses mapped to the symmetric memory component, enabling access to the other data within the symmetric memory component of the main memory within the computer system.

The memory table may be configured to associate other data stored in a different page as a page storing the data and residing within the asymmetric memory component with addresses of the asymmetric memory component. The memory map may be configured to map other virtual addresses to the asymmetric memory component addresses of the other data residing within the asymmetric memory component. It may be determined that the data is to be written in the asymmetric memory component based on a relationship between the data to be written and the other data residing within the asymmetric memory component. A second read request is received. It may be determined, based on the memory map, that the second read request is associated with one or more of the other virtual addresses mapped by the memory map to corresponding asymmetric memory component addresses. In satisfaction of the second read request and based on determining that the second read request is associated with one or more of the other virtual addresses mapped to the asymmetric memory component, access to the other data within the asymmetric memory component of the main memory within the computer system is enabled.

Determining that the data is to be written in the asymmetric memory component based on the relationship between the data to be written and the other data residing within the asymmetric memory component may include determining that the data includes a header label within the application and the other data includes content referenced by the header label.

The content stored in the asymmetric memory component may be analyzed, the content no longer being associated with the first virtual address as a result of configuring the memory map to map the physical address of the symmetric memory component to the first virtual address. A relationship may be identified between the content stored in the asymmetric memory component and the other data. The identified relationship may be used to determine whether to store the other data in the asymmetric memory component or the symmetric memory component.

Determining that the first read request is associated with the virtual address may include determining that the data implicated by the first read request has content related to data with which the first virtual address is associated.

It may be determined that the data has access characteristics more consistent with the asymmetric memory component than the symmetric memory component and to write the data to the physical address within the symmetric memory component of the main memory within the computer system, despite determining that the data has access characteristics more consistent with the asymmetric memory component than the symmetric memory component.

It may determined that the data is an update to data stored in the asymmetric memory component of the main memory within the computer system and to write the data to the physical address within the symmetric memory component of the main memory within the computer, despite determining that the data is the update to data stored in the asymmetric memory component of the main memory within the computer system.

Determining that the data may include a replacement of data stored in the asymmetric memory component of the main memory within the computer system, and it may be determined to write the data to the address within the symmetric memory component of the main memory within the computer, despite determining that the data has content related to data stored in the asymmetric memory component of the main memory within the computer system.

Determining to write the data to the physical address within the symmetric memory component may include detecting a write protection parameter associated with the physical address within the asymmetric memory component of the main memory within the computer, and determining, based on detecting the write protection parameter, to write the data to the symmetric memory component of the main memory within the computer system. Determining to write the data to the physical address within the symmetric memory component may include determining, based on the determination that the data to be written has content related to data stored in the asymmetric memory component, to write the data to the symmetric memory component of the main memory within the computer system.

Adjusting the memory map may include maintaining, within an operating system, a page table that maps a virtual address accessed by the application with a physical address associated with either the asymmetric memory component or the symmetric memory component of the main memory within the computer system, receiving, on a central processing unit (CPU), the command from the application to write the data to the virtual address accessed by the application, detecting, using the memory management unit, that the write protection bit for the virtual address accessed by the application, using the operating system to receive an allocation of memory from within the symmetric memory component of the main memory within the computer system, using the operating system to write the data to the allocated memory from within the symmetric memory component of the main memory within the computer system, and configuring the page table to associate the virtual address accessed by the application with a physical address for the allocated memory within the symmetric memory component of the main memory within the computer system.

Adjusting the memory map may include maintaining, using a hypervisor, a shadow page table that maps a virtual address accessed by the application with a physical address associated with either the asymmetric memory component or the symmetric memory component of the main memory within the computer system, receiving, on a CPU, the command to write the data associated with the virtual address accessed by the application, inspecting an entry for the virtual address accessed by the application in the shadow page table, and detecting the write protection parameter associated with the virtual address accessed by the application. An allocation of available memory in the symmetric memory component is identified using the hypervisor and the hypervisor is used to write the data to the allocated memory from within the symmetric memory component of the main memory within the computer system. Within the hypervisor, the shadow page table is configured to associate the virtual address accessed by the application with a physical address for the allocated memory within the symmetric memory component of the main memory within the computer system.

A memory management unit-specified physical address is received from the CPU that is processed by an intermediary component within the computer system as the virtual address and is associated with the command to write. The memory management unit-specified physical address is provided to the memory map in the intermediary component. The memory map is used to determine that the memory management unit-specified physical address is associated with the asymmetric memory component of the main memory within the computer system and, using the intermediary component, a symmetric memory physical address associated with available memory within the symmetric memory component of the main memory within the computer system is identified.

The symmetric memory physical address associated with the symmetric memory component of the main memory within the computer system is associated with the memory management unit specified physical address using the intermediary component. The data is written to the symmetric memory physical address associated with the symmetric memory component of the main memory within the computer system using the intermediary component.

DESCRIPTION OF DRAWINGS

FIGS. 11A and 11B are block diagrams of two configurations for a memory table that indicate how data is written to a virtual address that is associated with an asymmetric memory component.

FIG. 15 is a flow chart of a process by which a computer system processes read and write commands to an asymmetric memory component that has first data and second data loaded to the same page.

DETAILED DESCRIPTION

Figure 1:
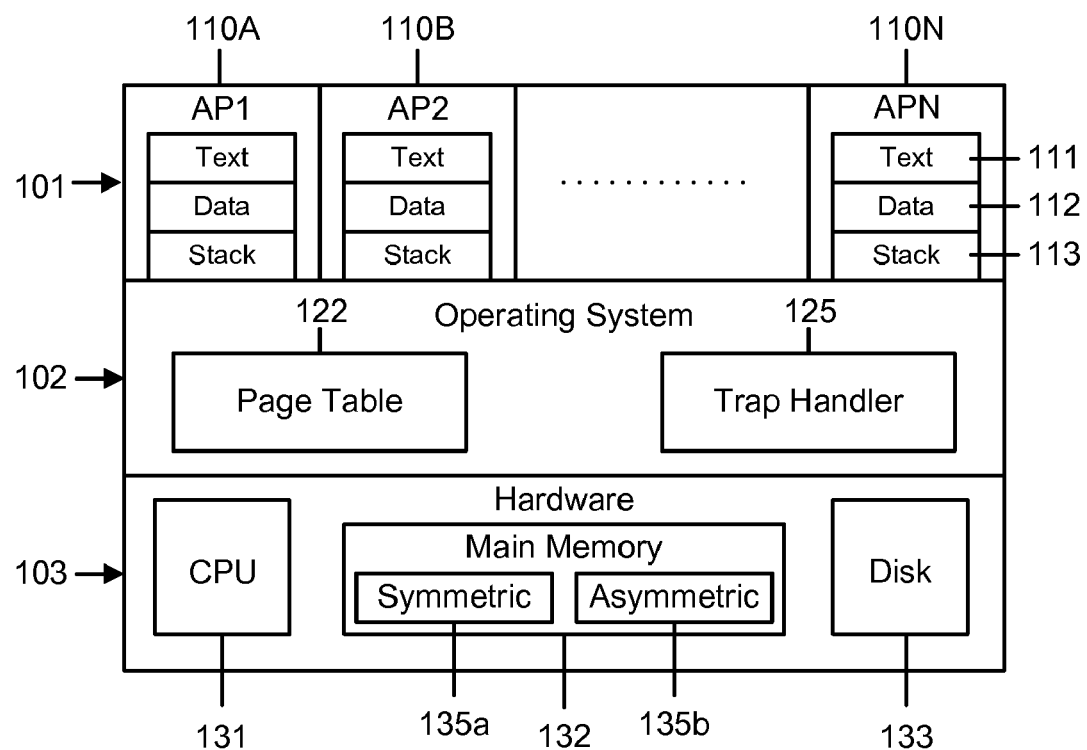
FIG. 1 illustrates an example of a first layer model of a computing system.

The detailed description is divided into four sections. Section A provides a brief description of method and mechanisms. Section B provides a description of the hardware, software, and system context. Section C provides a description of read movement, write movement, and integration. Section D provides a discussion of operations performed and additional configurations.

A. Brief Description of Method/Mechanism

The use of asymmetric memory components (e.g., NOR flash memory) within a computer system can help enable increased memory density and reduced power consumption. A computer system may be configured to use asymmetric memory as main memory, for example, to host a portion of the storage required by the application to operate. To illustrate, a computer system that is configured to use a hybrid main memory structure having symmetric and asymmetric main memory components may be configured to leverage its asymmetric main memory components by storing data to asymmetric memory directly, or by way of migration from its symmetric main memory components. The symmetric memory component within the main memory of the computer system is configured to enable random access write operations in which an address within a block of the symmetric memory component is written without affecting the availability of other addresses within the block of the symmetric memory component during the writing of that address. The asymmetric memory component is configured to enable block write operations in which writing to an address within a region of the asymmetric memory component affects the availability of other addresses within the region of the asymmetric memory component during the block write operations involving the address. An example of a symmetric memory component includes DRAM and an example of the asymmetric memory component includes NOR flash. Such a system may thereafter need to replace or update data that has been written to the asymmetric memory components. However, writing to some types of asymmetric memory may cause adverse system issues. For example, because NOR flash memory does not support random access write operations, and instead requires data to be written in blocks, writing to some types of NOR flash may result in a temporary yet undesirable loss of availability in NOR flash physical addresses that are different than the addresses to which the update is addressed (e.g., a write operation in a NOR flash device disrupts access to a bank of memory cells referred to as a disruption region, only a subset of which is actually being updated).

Described is a system that is configured to process write commands received from an application by writing data to a virtual address that is mapped to the hybrid main memory. When the virtual address corresponds to a location in symmetric memory, the write operation is allowed to proceed. However, when the write operation targets a location in asymmetric memory, the system performs a sequence of special processing operations to shield the system from the undesirable system behavior associated with a disruption region. More precisely, the system traps the write command before the write command is written to the asymmetric memory. The system may accomplish such a trap by detecting a write protection parameter for the virtual address, responsively adjusting a memory map to map the virtual address to a symmetric memory component of the main memory instead of the asymmetric memory component of the main memory. A random access write operation is then used to write data associated with the virtual address to the symmetric memory component of the main memory to which the virtual address is now mapped.

For example, a server running a search application may use NOR flash memory as part of the main memory. The server may load a search index to the NOR flash memory. In the course of using the search application to offer search services, a CPU in the server retrieves portions of the search index from NOR flash memory, and relates the portions of the search index to a search query to identify results responsive to the search query. During the operation of the search application, read operations may be employed to retrieve data from the NOR flash memory in satisfaction of queries. However, to the extent that updates must be made available to the search index, additional operations are required. To effect such updates without requiring direct writes to NOR flash memory and consequential block unavailability, attempts to write to the NOR flash memory can be interrupted and evaluated for redirection to symmetric main memory components on the server. More particularly, when a memory controller on the server receives a write instruction addressed to a virtual address that is associated with a physical address for the NOR flash memory, the write instruction is trapped. That is, the memory controller is configured to interrupt the write instruction, and with the assistance of an operating system or a hypervisor, allocate memory for the write instruction in DRAM also within the server's main memory, and configure a memory map to associate the virtual address with a physical address for the newly-allocated location in DRAM. The memory controller then may configure the update to the search index to be written to the newly-allocated address in the symmetric memory (e.g., DRAM). In a subsequent operation to read the updated portion of the search index, the update is read from symmetric memory.

In one configuration, a system that has loaded the search index to a hybrid memory system having NOR flash and DRAM memory determines that the virtual address for an update to the search index is mapped to the NOR flash portion of the hybrid memory system. The system then detects a write protection parameter for the virtual address, and adjusts, in response to detecting the write protection parameter, a memory map to map the virtual address to DRAM instead of the NOR flash.

The system then uses a random access write operation to write the update to the data associated with the virtual address, that is, by writing the search index update to the DRAM location to which the virtual address is mapped. In a configuration in which the memory table only offers page level access and does not offer more granular access to data in the asymmetric memory component, writing the search index update may require a memory controller to first retrieve a page from NOR flash that stored the previous instance of the search index update. Put differently, even though the update may only relate to a portion of the page, writing to any portion of the page may require the memory controller to retrieve the entire page from NOR flash. A portion of the read page then may be updated with the search index update. A memory table then may be modified to indicate that the page with the search index update is now stored in DRAM. The memory table also may be modified to indicate that the physical address in NOR flash corresponding to the original location of the page is no longer being used.

Alternatively, if the search index update relates to a different page in a disruption region than the page being updated, a memory controller may permit continued access to data in the other page in the same disruption region of the NOR flash. In response to receiving a read request for the search index that implicates the proximate other data within the asymmetric memory component, the system enables access to the other page within the NOR flash and to the updated data within the DRAM.

B. Description of Hardware, Software, and System Context

Referring now to FIG. 1, an example of a first layer model 100 of a computing system is illustrated. The first layer model 100 includes an application (AP) layer 101, an operating system (OS) layer 102, and a hardware (HW) layer 103. The AP layer 100 includes one or more application processes AP1 110A through APN 110N.

Examples of application processes may include a web browsing or hosting program, a word processing program, a search program, a data mining and analytical program, or other type of application configured to execute on the AP layer. Application programs may be stored on a disk and remain in a passive state until a user chooses to execute an application program where it is loaded into memory as an application process.

Although other application processes may be employed, each application process (AP1 110A to APN 110N) loaded into memory may be allocated space in the main memory including a text region 111, a data region 112, and a stack region 113. The text region 111 may include executable instructions associated with the application program. The data region 112 may include data associated with the application. The data may be dynamic and/or static. The stack region 113 may include a state of a function or procedure of the application program and its activation frame.

The hardware layer 103 may include a central processing unit or processor 131, a main memory 132, and a hard disk storage 133. The main memory 132 may include symmetric memory 135*a* (e.g., DRAM) and asymmetric memory 135*b* (e.g., NOR flash memory). In one implementation, the asymmetric memory 135*b* is NOR flash electrically erasable programmable read only memory (EEPROM).

The operating system layer 102 resides between the HW layer 103 and the AP layer 101. The operating system layer 102 may be a modified operating system, such as Microsoft Windows, Linux, or another Unix variant, configured to manage hardware included in the HW layer 103 of the computer system. The operating system may include a flash memory trap handler 125 configured to manage the asymmetric memory 135*b* in the main memory 132. The flash memory trap handler 125 may be configured to reduce the number of write accesses to the asymmetric memory 135b.

Multiple processes may place demands on main memory 132 in a computer system. The operating system may respond to those demands for main memory 132 by managing how physical memory is allocated to a virtual address space of each process executing on the AP layer 101. In some implementations, the operating system may use virtual memory management techniques to efficiently manage available physical memory resources and to indicate to the application processes that there is more memory capacity available for use over and beyond the physical memory capacity in main memory 132. In these implementations, the operating system 102 maintains a page table 122 to map virtual addresses in application processes to physical addresses in main memory 132. The hard disk storage 133 may be used to provide additional memory capacity for an application process.

Virtual memory management techniques may be configured to estimate the immediate memory needs in a specified application and allocate physical memory responsive to the specified application's needs, as opposed to other memory requirements that can be deferred and allocated to hard disk storage 133. A contiguous addressable range of memory, referred to as a page, may be swapped between physical main memory 132 and hard disk storage 133 as its need for immediate use increases or decreases.

Figure 2:
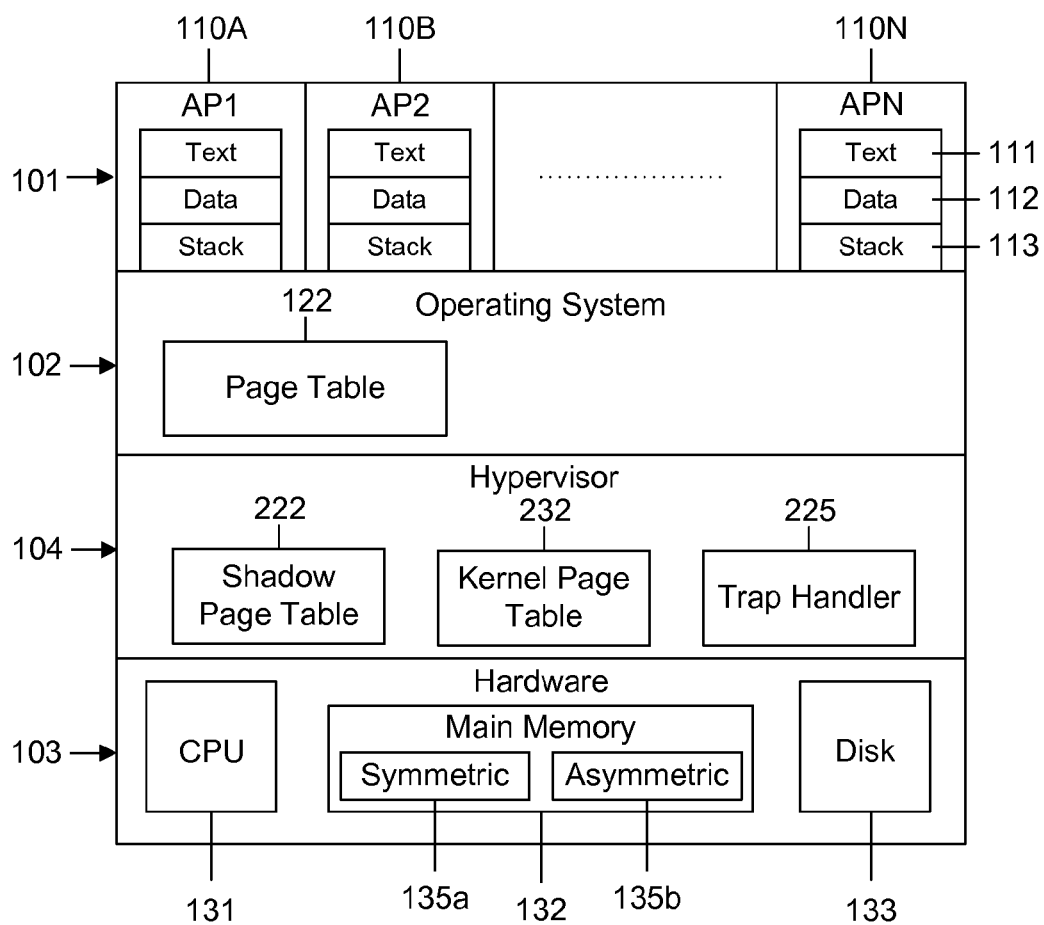
FIG. 2 illustrates an example of a second layer model of a computing system.

Referring now to FIG. 2, an example of a second layer model 200 of a computing system is illustrated. The second layer model 200 includes an application (AP) layer 101, an operating system (OS) layer including one or more host operating systems 102, a hypervisor layer 104, and a hardware (HW) layer 103.

The second layer model 200 differs from the first layer model 100 in that the hypervisor layer 104 is included between the operating system layer 102 and the hardware layer 103, and, instead of the operating system being modified, the hypervisor in the hypervisor layer 104 includes a write access hypervisor trap handler 225 configured to manage the asymmetric memory 135b. The write access hypervisor trap handler 225 may be configured to reduce the number of write accesses to the asymmetric memory 135b in the main memory 132.

A hypervisor in a computer system may be a layer of hardware, software, firmware, or combinations thereof operating between the operating system layer and the hardware layer that allows one or more host operating systems (or portions of an operating system) to run, unmodified, on a host computer at the same time.

Each of the one or more host operating systems 102 may maintain one or more page tables 122 to map virtual addresses in application processes to physical addresses in main memory 135. The hypervisor layer 104 may maintain one or more respective shadow page tables 222 for each host operating system to map virtual addresses of the application processes to physical addresses in main memory 135.

Figure 2A:
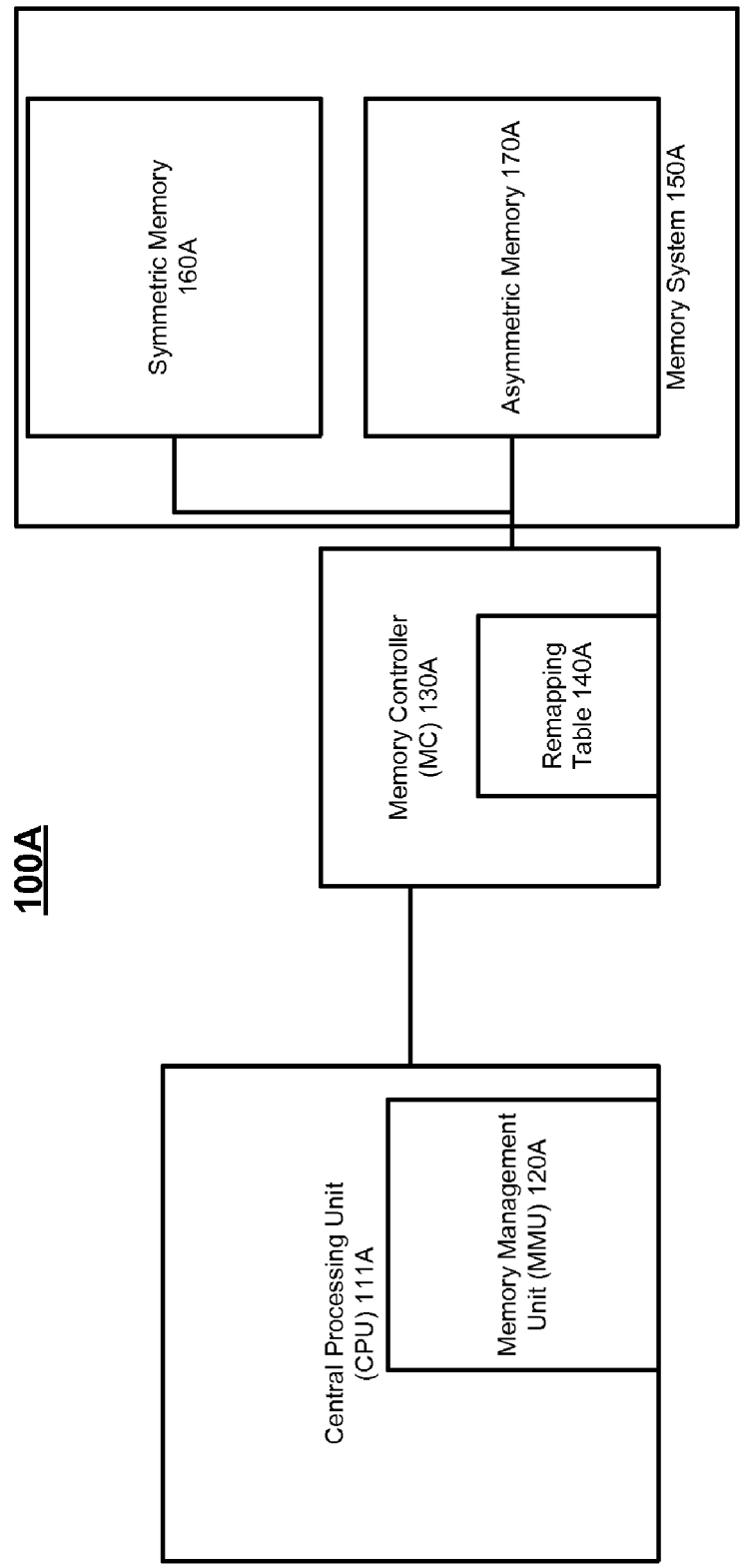
FIG. 2A is a block diagram of a system with a CPU that interfaces with a memory system through a memory controller.

FIG. 2A is a block diagram of a system 100A with a CPU 111A that interfaces with a memory system 150A through a memory controller 130A. More precisely, the memory controller 130A is positioned, oriented, and configured to enable it to be leveraged in processing read and write requests from the memory management unit 120A to the memory system 150A while shielding the CPU 111A from challenges resulting from particular access characteristics associated with asymmetric memory 170A.

The CPU 111A includes logic configured to implement one or more processing operations. Examples of a CPU 111A may include x86-based processors from Intel Inc. and Advanced Micro Devices Inc. (AMD), and/or ARM™ processors. The CPU 111A may include one or more processor cores.

Generally, each CPU 111A interfaces with an operating system. The operating system, in turn, may interface with one or more applications. These applications may include a search engine, business analytics, data mining, database operations. Each of these applications may be compiled (or interpreted) into different machine-level instructions for execution on the CPU 111A. Although only one CPU 111A is shown, multiple CPUs may be used. Each CPU 111A supports an instruction set with a variety of instructions. These instructions may include, among other operations, register shifts, arithmetic operations, and memory operations. Examples of the memory operations may include random access read and write operations and I/O read and write instructions that can be used to initiate block read and write operations.

As shown, the CPU 111A includes a memory management unit 120A. Generally, the memory management unit 120A is configured to manage a physical address space for the CPU 111A. As the CPU 111A is executing a program, the CPU 111A may request to read data from a particular address and write data to a particular address. More precisely, the memory management unit 120A may be configured to receive a virtual address from the CPU 111A and translate the virtual address into a physical address (i.e., a memory management unit-specified physical address). In the case of a read, the CPU 111A may be configured to consult the memory management unit 120A to obtain the physical address associated with the virtual address specified by the CPU 111A. The memory management unit 120A (or some other entity) in the CPU 111A is instructed to retrieve data from the MMU-specified physical address. Other systems (e.g., the memory controller 130) may, in turn, process the memory management unit-specified physical address as an additional type of virtual address. In another configuration where a translation element of an MMU is separated out from the portion of the CPU that is responsible for interacting with the memory subsystem, the MMU may be configured to obtain the physical address associated with the virtual address. The MMU (or another entity in the CPU) then may be instructed to retrieve data from the MMU-specified physical address.

The memory controller 130A is logically oriented as an intermediary system to enable the CPU 111A to interface with a memory system 150A. More precisely, the memory controller 130A is a system configured to receive read and write instructions with a memory management unit-specified physical address from the memory management unit 120, lookup a memory controller-specified physical address associated with the memory management unit-specified physical address, and perform the requested read and/or write instruction on the block(s) of physical memory corresponding to the memory controller-specified physical address.

The memory controller 130A includes logic (hardware and/or software) configured to manage the placement of and movement of data within a memory system 150A. The memory controller 130A may be configured to dynamically process instructions based on a determination of whether the data and/or address is associated with symmetric memory or asymmetric memory. Similarly, the memory controller 130A may be configured to process read instructions in a first way, and process write instructions in a second way. For example, the memory controller 130A may be configured to permit read operations from the memory management unit that specify a particular address to leverage or otherwise operate on a first address within asymmetric memory, while concurrently processing write operations from the memory management unit that specify a particular address to leverage or otherwise operate on a second address within symmetric memory.

The memory controller 130A includes a physical interface to the memory system 150A. The physical interface is configured to automatically exchange physical address information as the memory controller 130A interfaces with the memory system 150A.

The memory controller 130A includes a remapping table 140A that stores an association between a memory management unit-specified physical address and a memory controller-specified physical address. The remapping table 140A may associate multiple memory controller-specified physical addresses with a memory management unit-specified physical address. For example, the remapping table 140A may be configured to indicate that writes to the disruption region should be directed to a "new" physical address range for the memory management unit, while reads from the disruption region should be directed to the "old" physical address range. Moreover, the remapping table 140A may indicate that a particular memory management unit-specified physical address is associated with a disruption region. For example, high-order address bits and some low-order bits in the MMU-supplied physical address may be analyzed to indicate which bank is being used. Alternatively, the memory controller may include logic (or include another column in a software table) that identifies the bank being used. Configuring the memory controller to have a bank identifier readily available may be used to reduce the processing burden of identifying a bank, for example, when performing write operations. The memory system 150A may include symmetric memory 160A and asymmetric memory 170A. The memory system 150A may be packaged as one or more DIMMs (Dual Inline Memory Modules) and configured to support DIMM protocols, signaling, interconnects, and physical interfaces.

The symmetric memory 160A includes one or more memory systems where read characteristics have similar properties to the write characteristics. Examples of symmetric memory include DRAM, and other random access memory technologies.

The asymmetric memory 170A includes one or more memory systems where read characteristics and write characteristics are dissimilar. For example, some types of asymmetric memory have write latencies that are orders of magnitude greater than the read latencies. Examples of asymmetric memory may include NOR flash. With some types of asymmetric memory, an interface is used to (among other things) require an entire region of content to be rendered inaccessible to read requests whenever any constituent block of the region is written, for example, using an I/O block write, instead of a smaller, random access write to the specific update location.

In configurations where the memory system 150A resides in DIMM packaging, the DIMM may be configured to dynamically process read and write instructions. For example, in a read mode, one or more DIMMs may be configured to receive instructions to access content residing at a particular physical address, and provide requested content to the processor through the memory controller. Generally, in a write mode, the DIMM is configured to receive data to be written with a physical address. Depending on whether the physical address represents flash or DRAM, the data may be written in a random access manner (e.g., a word or byte) or in a block (e.g., a 4 Megabyte or a 4 kilobyte block). In one configuration, the DIMM is entirely made up of one type of memory (e.g., DRAM or NOR flash). In another implementation, the DIMM includes a hybrid of both DRAM and flash and relies on an internal or external memory controller to perform the different operations required to implement a hybrid memory system. And, although one or more configurations were described where a hybrid and/or dedicated configuration was used, a different configuration may be used.

C. Description of Read Movement, Write Movement, and Integration

FIGS. 1, 2, and 2A illustrate different components in a server system that may be configured to interface with and control aspects of a memory system with symmetric and asymmetric components. In one configuration, a hybrid (e.g., symmetric/asymmetric volatile/non-volatile, DRAM/Flash, etc.) main memory system may be used by modifying application programs to decide which portions of its text (e.g., code) and data areas to map to symmetric regions and asymmetric regions in the main memory. The mapping by the application program may be modified to reflect characteristics of different types of memory. For example, a memory controller may be configured to selectively load data to memory in response to a relatively slow latency seen with a type of flash memory region accesses, as well as other properties of the type of flash memory device, such as the limited write lifetime, limited number of reads between writes, and the relatively longer latency for erase and write operations. Modifying application programs to support a hybrid main memory including DRAM memory and flash memory may pose one or more of the following or other challenges.

For example, restructuring application programs to be aware of and interface with a hybrid memory system may be easier to implement if the modification to the structure of the application is limited. In this example, application programs that rely on memory-mapped input/output ("I/O") functionality, similar to that provided by a memory map ("mmap") system call, may reduce the degree of restructuring that is required to support a hybrid main memory. Existing parameters and arguments supplied with a mmap call may be used to make a determination about whether or not a certain I/O object should reside in the asymmetric memory region. However, applications that are associated with a more dynamic use of memory resources, for example, to implement an application-specific cache for I/O objects, may require a more extensive revision to the memory commands in order to support a hybrid main memory. In one example, a program associated with a more dynamic use of memory resources may be specifically configured to operate with certain symmetric (e.g., DRAM) memory characteristics, and thus, may have read/write access behaviors that are not well suited to asymmetric memory.

In some implementations, unmodified application programs (e.g., a program encoded in binary form) may be used with a hybrid DRAM/flash memory subsystem. In these implementations, the portion of the application code and data that are accessed in a read-only fashion and/or operations that are relatively tolerant of increased access latency, may be migrated over time in an adaptive fashion from DRAM memory regions into the flash memory regions in the main memory.

Figure 3A:
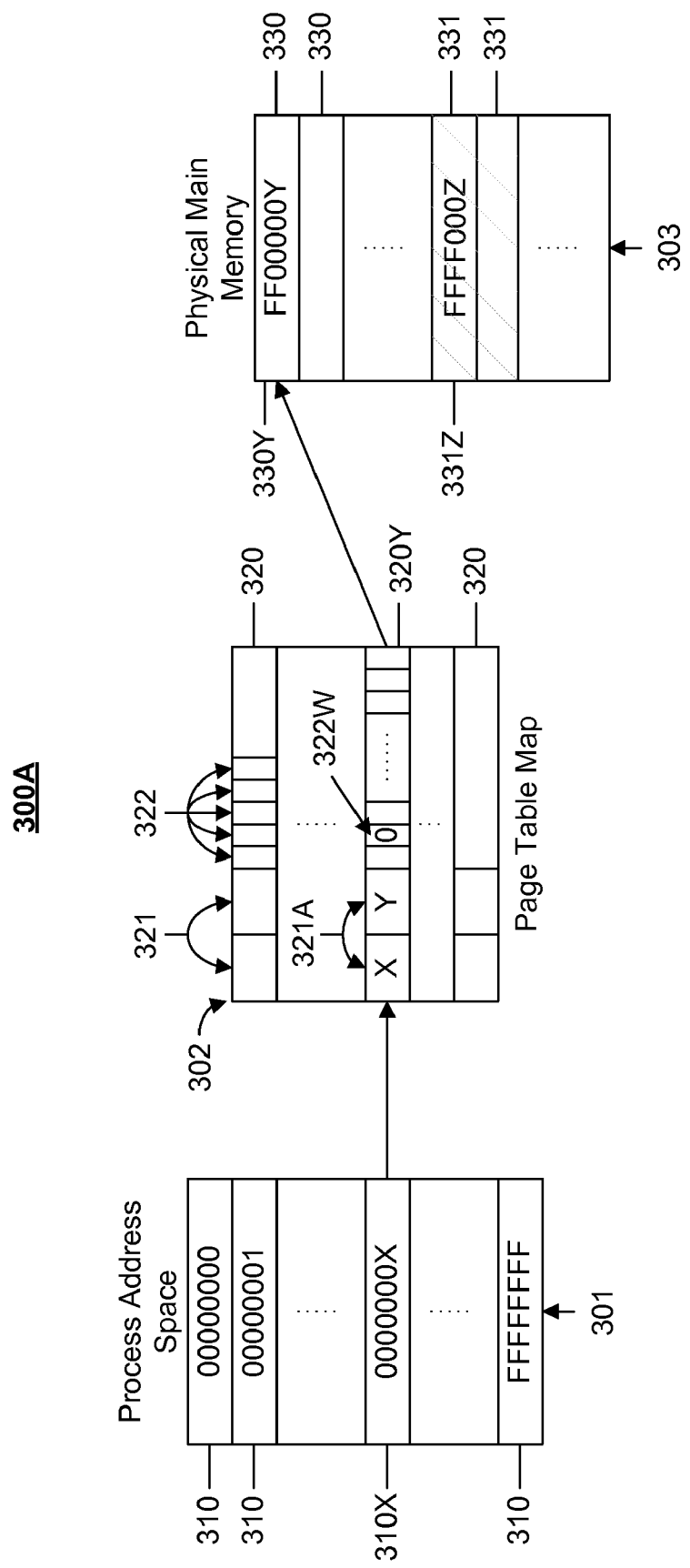
FIGS. 3A-3B are diagrams illustrating an example of mapping a virtual address space of an application running on a processor into a physical address space of a hybrid main memory using a page table map.

Referring now to FIG. 3A, a virtual address space or processor address space 301 may be mapped into a physical hybrid main memory 303 by a page table map 302. That is, a plurality of pages 310 associated with virtual addresses may be mapped to physical addresses of a plurality of physical pages in the hybrid main memory 303. The page table map 302 may include one or more page table entries (PTE) or slots (320A-320N) to map the virtual page address to the physical page address. The page table map 302 may be in a structure called the page table and may be maintained by the operating system. Page table map and page table may be referenced interchangeably.

Figure 5A:
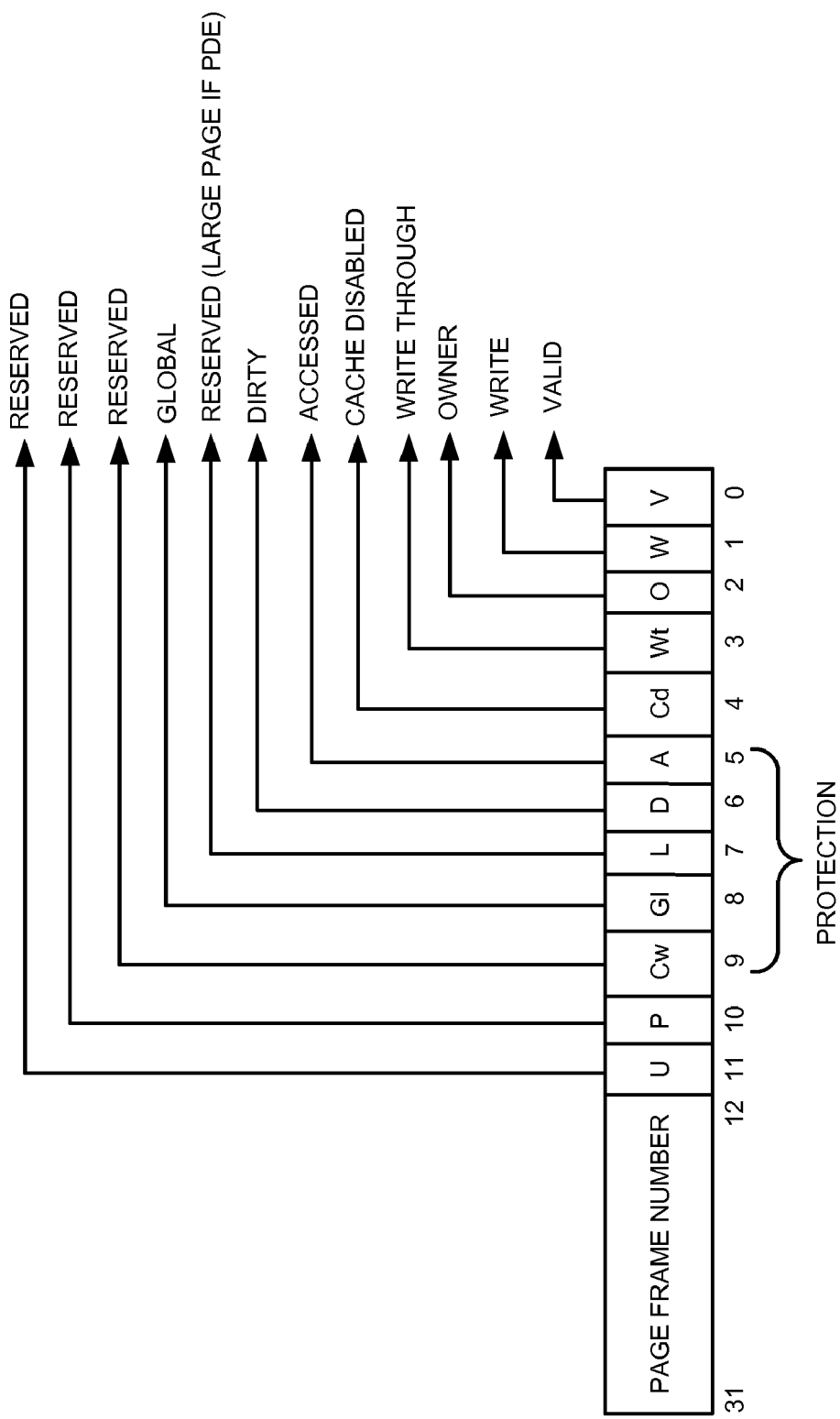
FIG. 5A is a diagram illustrating the bits and bit fields in a page table entry in a page table, which is illustrated as having 32 bits.

Each slot 320 in the page table map 302 may include a page frame number (PFN) 321 and one or more protection bits 322, one of which may be a write protection bit 322W that may be used to provide/signal page protection. The write protection bit controls whether CPU-initiated writes are allowed against virtual page locations corresponding to the page table entry. When set, writes are disallowed, resulting in an operating system or hypervisor level trap that enables software to exercise control over whether and how the write operation is performed. FIG. 5A shows other bits and bit fields that may be included in each slot 320 of an exemplary thirty-two bit wide PTE of page table map 302. In a 32-bit wide addressing scheme, bits 31-12 identify the page frame number. Bit 11 is reserved and writable on multiprocessor systems. Bits 10 and 9 are reserved. Bit 8 is a global bit, and bit 7 is used to identify whether the page is a large page. Bit 6 is a dirty bit identifier indicating whether the page has been written to. Bit 5 indicates whether the page has been read. Bit 4 indicates that the cache has been disabled, and bit 3 indicates that write through is supported to disable caching of writes to this page so that changes are immediately flushed to disk. Bit 2 indicates whether the user mode can access the page or whether the page is limited to kernel mode access. Bit 1 indicates whether the page is read/write capable or only readable, controlling whether the page is writable. Bit 0 indicates whether the translation maps to a page in physical memory.

Figure 5B:
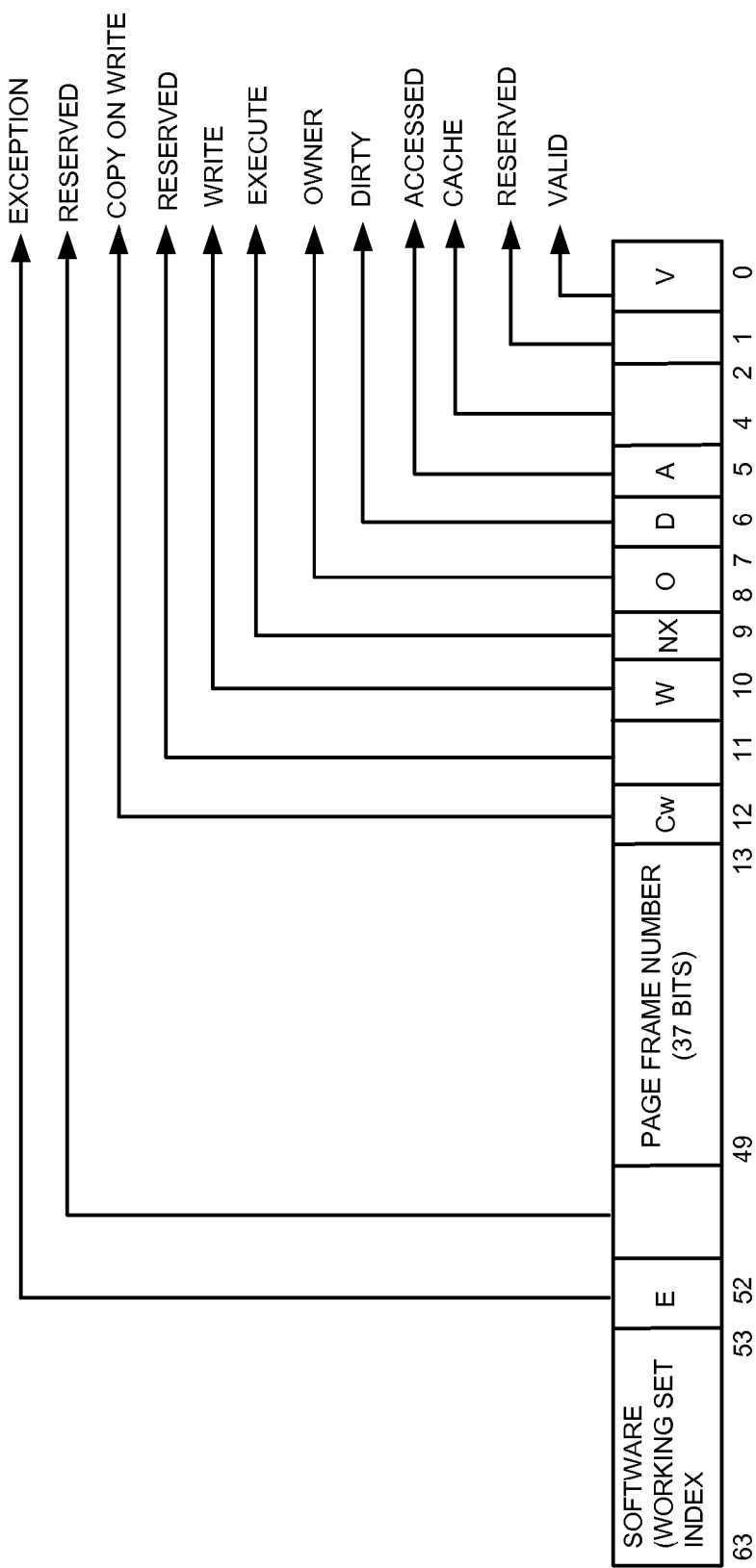
FIG. 5B is a diagram illustrating the bits and bit fields in a sixty-four bit slot or page table entry in a page table.

FIG. 5B is a diagram illustrating the bits and bit fields in a sixty-four bit slot or page table entry in a page table. In a sixty four bit wide addressing scheme, bits 63-53 are software representing a working set index. Bit 52 is used to indicate exceptions, and bits 51 and 50 are reserved. Bits 49-13 represent the page frame number. Bit 12 is used to indicate a copy on writes, and bit 11 is reserved. Bit 10 is used to indicate whether writes are allowed, and bit 9 is used to indicate the execute bit. Bits 8 and 7 indicate owner parameters specifying whether the user mode can access the page or whether the page is limited to kernel mode access. Bit 6 is a dirty bit indicating whether the page has been written to. Bit 5 is an access bit indicating whether the page has been read. Bits 4-2 indicate the cache parameters. Bit 1 is reserved and bit 0 indicates whether the page is valid or not.

In one example, the write protection bit may be set to logical zero to indicate that the associated page is read-only. In another example, the write protection bit may be set to logical one to indicate that the associated page is read-only. In either example, the write protection bit may be changed to indicate that the associated page is read accessible only. Without the write protection bit being appropriately set to protect a page from write access, the page may be both read and write accessible.

In translating a virtual address to a physical address in physical memory, additional translation hierarchy may be used in addition to the page table map 302 to provide additional addressable memory. The hierarchy may include page directories to point to page tables, page directory pointer tables to point to page directories, and a page map level table to point to the page directory pointer tables. However, the page table map 302 may be used to support the hybrid main memory at the lowest level of the address translation hierarchy.

In one initial default configuration, an application may be assigned by the page table map 302 to use DRAM memory pages 330 in the hybrid main memory 303. For example, a virtual page X of addressable memory 310X indexes into, relates to, or points to a slot 320Y in the page table map 302 to translate the virtual address into a physical address that points to a DRAM memory page Y 330Y in one of the DRAM memory regions of the physical hybrid main memory 303. In this example, the write protection bit 322W of the slot 320Y in the page table map 302 is set to zero to indicate that the DRAM memory page 330Y in the physical hybrid main memory 303 is both read and write accessible.

Figure 3B:
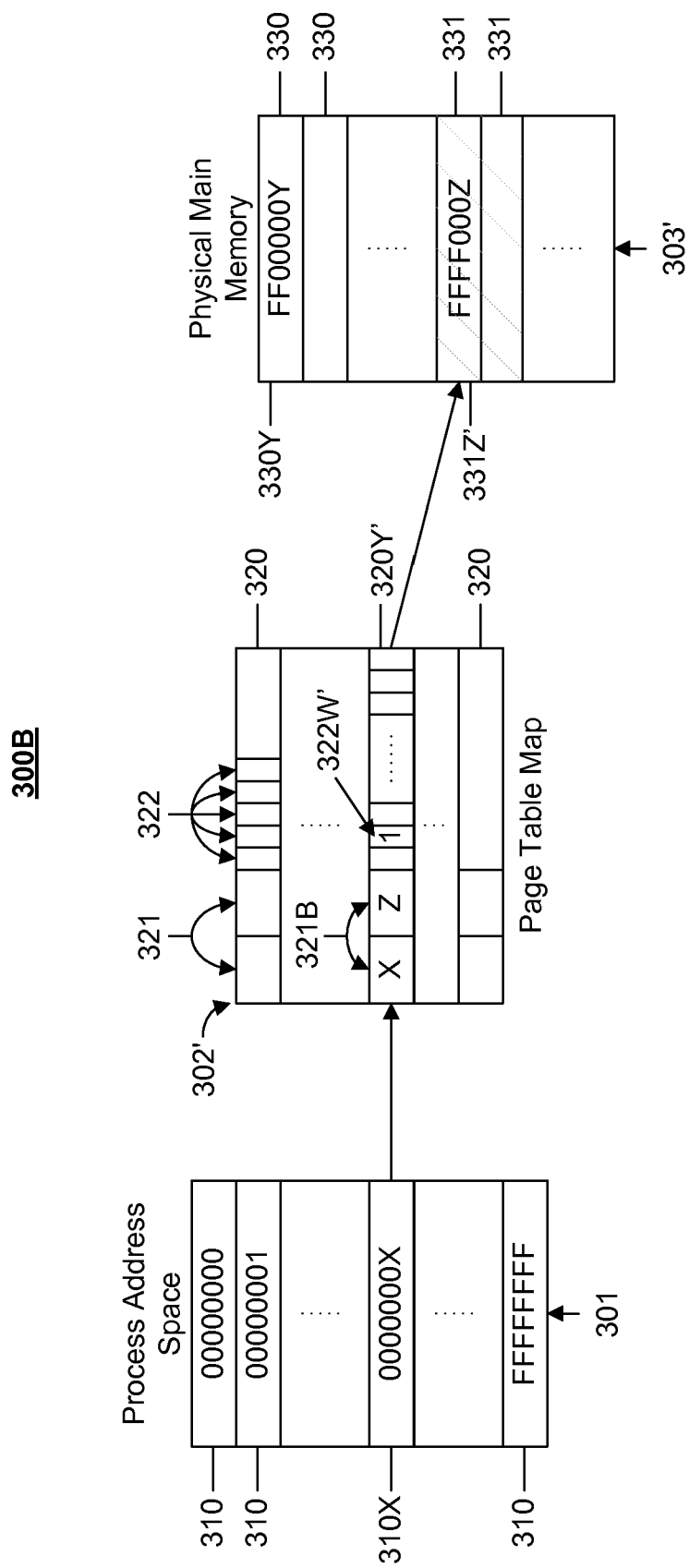

Referring now to FIG. 3B, the information in the DRAM memory page Y 330Y has been copied into the flash memory page Z 331Z', for example. In this example, the page frame number in slot 320Y' in the page table map 302' has been updated to page frame number 321B to translate the virtual page address 310X to point to the flash memory page Z 331Z'. The write protection bit 322W has been changed to the write protection bit 322W' to signal that the access through the virtual page address X 310X to the flash memory page Z 331Z' is a read access only with write accesses being trapped. Modification of the write protection bit may disallow random write access to the flash memory page Z 331Z'. After migrating the information to flash memory, the DRAM memory page Y 330Y is freed-up so that it may be used to store other information.

In implementations in which write access to the flash memory page Z is disallowed, if an application attempts to write using a store instruction to the protected flash memory page, the application is interrupted and a protection handler (e.g., the trap handler) in the operating system is given control to handle the write operation to the protected flash memory page Z 331Z'. The attempt to write to the protected page may be referred to as a general protection fault or a segmentation violation that is trapped by the operating system.

Figure 4:
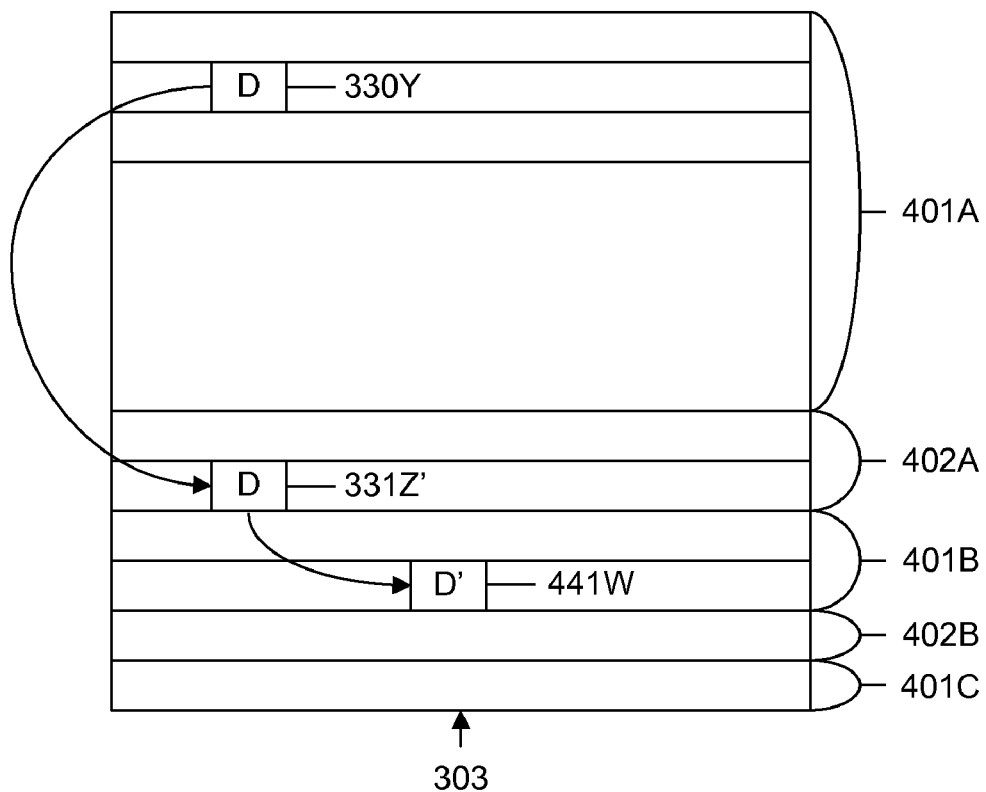
FIG. 4 is a diagram of main memory illustrating an example of migration of information between symmetric (e.g., DRAM) memory regions and asymmetric (e.g., flash) memory regions.

Referring to FIG. 4, consider, for example, a hybrid main memory 303 including one or more DRAM memory regions 401A-401C and one or more flash memory regions 402A-402B. A page 330Y of application code and/or data D may be stored in the DRAM memory region 401A of main memory 303 by an application program. Data may be moved into the flash memory regions directly from DRAM or from another source. In response, the application code and/or data D stored in page 330Y may be copied and written into a page 331Z' in the flash memory region 402A. The page 330Y in the DRAM memory region 401A may be thereafter freed and used for other purposes that require write access or that are less tolerant of access latency increases (e.g., the physical address for page 330Y may be put on a free list maintained by the operating system to indicate that it is unallocated to any process).

Because write access times into asymmetric memory devices may be significantly longer than read access times, a modified operating system may be configured to trap attempted write accesses into the asymmetric memory. The trap may be configured by setting the write protection bit in the page table entry to permit only read accesses. An attempt by the processor to write to a location on the corresponding page may trigger a protection fault. A protection fault handler or trap handler 125 can either complete the write (at the slower speed), or decide to copy back the page of data into a DRAM memory page and update it with the write access into the DRAM memory page. Such a DRAM memory page may also be marked, for example, in the page table, as being non-migratable into a flash memory page for a period of time so as to complete the update of the information by writing into the DRAM memory page. For example, the memory controller may create an access collections table, or modify a memory table to include parameters to track access to data in memory. Reading a virtual address may increment a read counter while writing a virtual address may increment a write counter or set a warning flag indicating that a write to the virtual address has been recently performed. The access collections table may be modified to include a time parameter indicating that the page should not be migrated for (1) a specified duration or monitoring cycle, or (2) until a threshold degree of reads are performed before another write operation is performed. The access collections table may track the amount of data written to storage and the elapsed time since the data was migrated to the asymmetric memory component. The amount of data written may be used in prioritizing which data is migrated to the asymmetric memory component so that larger amounts of data are favored as being computationally more efficient. The elapsed time since the data was migrated may be used to as an indicator of whether the data is likely to be subject to future write operations. Referring now to FIG. 4, if the application attempts to write to the protected flash memory page 331Z', a new DRAM memory page W 441W may be allocated in the main memory 303. The information content D may be copied into the DRAM memory page W 441W. In the slot of the page table map, the PFN is updated to indicate the DRAM memory page W 441W and the write protection bit 322W' is changed back to protection bit 322W such that the page is writable so that the application may write new information into the DRAM memory page W 441W. The information D is thereafter updated to information D' in the DRAM memory page W 441W.

After a threshold of writes have been collected in the access collections table, or a threshold of time has passed, the information being collected in DRAM memory may be integrated back into NOR flash memory. The process for performing this migration may include using the same controlling logic that was used during the original move of information from DRAM into NOR.

Figure 6:
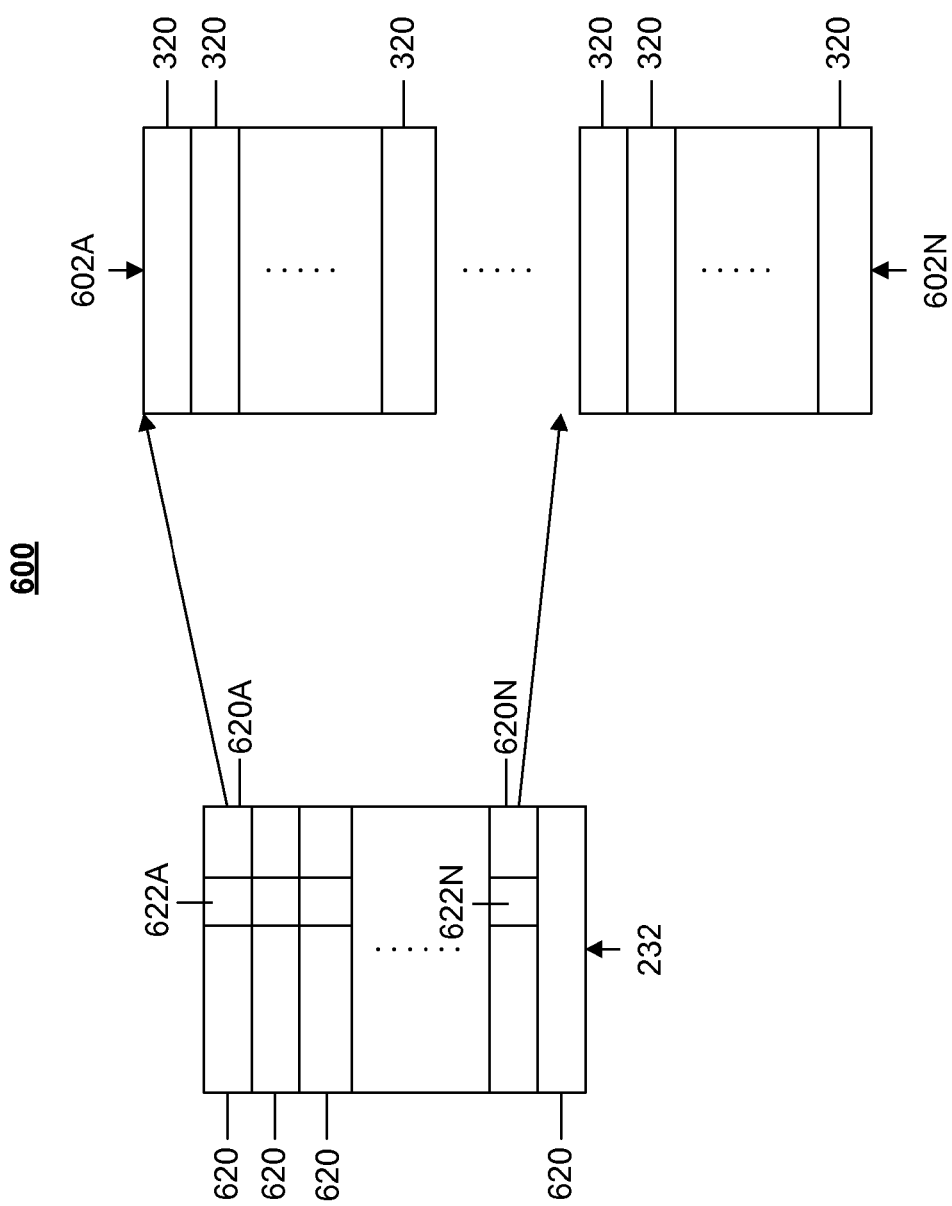
FIG. 6 illustrates an example of a multilevel mapping of virtual address space of an application running on a processor into a physical address space of a hybrid main memory using a kernel page table maintained by a hypervisor.

FIG. 6 illustrates a multilevel mapping 600 of virtual address space of an application running on a processor into a physical address space of a hybrid main memory by means of a shadow page table map. More precisely, and also referring back to FIG. 2, the hypervisor 104 maintains a shadow page table 222 to that of the page table 122 maintained by the operating systems in order to map virtual addresses of applications running under the control of one or more host operating systems to physical addresses in main memory 135. The shadow page table 222 in the hypervisor 104 is similar to the page table 122 maintained by the one or more host operating systems 102. However, in multilevel mapping 600, the hypervisor 104 alters the bits in the shadow page table 222.

The hypervisor supports executing one or more copies of a host operating system to provide the illusion of enabling multiple virtual machines on one physical machine. The hypervisor manages the allocation of raw hardware resources, including main memory, amongst the one or more virtual machines.

The shadow page table 222 in the hypervisor 104 is similarly managed as the page table 303 discussed previously to migrate information in DRAM memory regions into flash memory regions of a main memory. That is, the shadow page table 222 has its page table entries updated as information in DRAM memory pages are copied into flash memory pages and vice-versa. The hypervisor 104 also changes the write protection bits in the slots of the shadow page table 222 to protect the corresponding mapped flash memory pages from being written.

In one configuration, the hypervisor trap 225 works in conjunction with the kernel page table (KPT) 232 maintained by the hypervisor 104. In this configuration, the kernel page table 232 has one or more slots or page table entries 620 that point to the physical address for each process page table 602 of each respective operating system of each respective virtual machine maintained by the hypervisor. For example, entry 620A points to the process page table 602A for a first operating system of a first virtual machine. Entry 620N points to the process page table 602N of the Nth operating system of the Nth virtual machine. Each process page table 602 has page table entries 320 to map virtual addresses to physical addresses. For an operating system to allocate or modify a process page table 602, it ends up passing control to the hypervisor via with the kernel page table 232. Before the operating system can allocate or modify a process page table 602, the hypervisor trap 225 traps the instruction that wants to update information located in certain locations of the page table.

Upon initial allocation, the hypervisor allocates a process page table to a given operating system but prevents it from being written to by the operating system. This prevents the operating system from changing the bits in the process page table. In this configuration, this behavior is achieved as follows. Each slot or entry 620N in the kernel page table 232 includes a protection bit 622N to protect its associated process page table 602N from being written.

In one configuration, the DRAM memory resources freed up because of the migration of information from a page in a DRAM memory region to a page in the flash memory region of the hybrid main memory may be used by the hypervisor to support the memory requirements of other virtual machines. In a second configuration, these freed resources may be made available for use by the virtual machine from which they were recovered by dynamically expanding the memory allocation initially configured for that machine.

D. Discussion of Operations Performed and Additional Configurations

Figure 7:
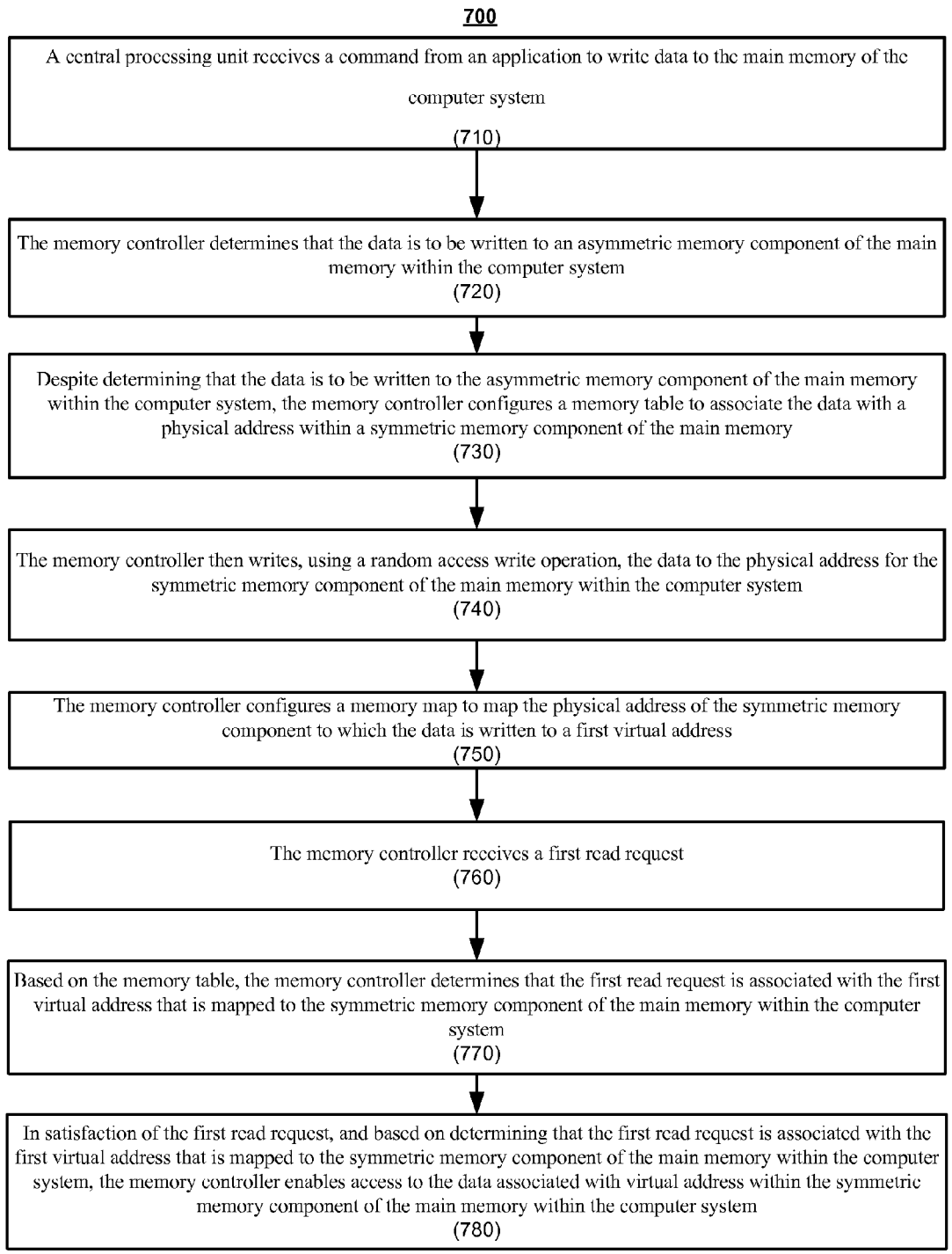
FIG. 7 is a flow chart of a process by which a system executes a write directed to a virtual address corresponding to its main memory.

FIG. 7 is a flow chart 700 of a process by which a computer system writes to a virtual address associated with data residing within an asymmetric memory component of main memory of and within a computer system. With this process, despite the association of the virtual address with the data residing within the asymmetric main memory component, or the component itself, as the data is being written to the virtual address, upon receipt of a read request related to the data, the computer system enables access to proximate other data residing within the asymmetric memory component and the update associated with the write command. The symmetric memory component within the main memory of the computer system is configured to enable random access write operations in which an address within a block of the symmetric memory component is written without affecting the availability of other addresses within the block of the symmetric memory component during the writing of that address. The asymmetric memory component typically enables read access with times comparable to the symmetric memory components but it is commonly configured to perform block write operations in which writing to an address within a region of the asymmetric memory component affects the availability of other addresses within the region of the asymmetric memory component during the block write operations involving the address. Although the operations are described as generally being performed by a memory controller, the operations may be performed on a memory controller that resides in the operating system, a hypervisor layer, or works in association with specialized hardware.

Initially, a central processing unit receives a command from an application to write data to the main memory of the computer system (710). In one example, writing data to main memory may include replacing or updating a record within an application. That is, the application may instruct the CPU to increment an application variable being stored at a particular virtual address from '46' to '47'. In another example, writing the data to main memory may include adding to a sequence of record. For example, the application may configure the CPU to add '106' to a tuple that already includes '42', '67', and '83'.

In one configuration, receiving the command from an application includes receiving a granular write command to write a word, for example, using a random access write command. In another configuration, receiving the command from the application includes receiving a block write to a 4 Kbyte page to a virtual address. In still another configuration, receiving the command from the application includes receiving a command to write an amount of storage found in a bank (e.g., a 2 GB chunk for a bank).

In one configuration, the application is configured to specify a virtual address for the data to be written. In another configuration, components between the application and the memory system (e.g., a hypervisor layer, an operating system, and/or an intermediary component) are configured to identify a location for the data to be written.

The memory controller determines that the data is to be written to an asymmetric memory component of the main memory within the computer system (720). In one configuration, determining that the data is to be written to an asymmetric memory component includes accessing a virtual address associated with the data to be written, querying a memory table with the virtual address, and determining whether the data to be written is currently mapped to asymmetric memory. Determining whether the data to be written is currently mapped to the asymmetric memory may, in turn, include determining whether the physical address currently associated with the virtual address maps to asymmetric memory, or, detecting a write protection parameter (e.g., a write protection bit) associated with the virtual address and inferring memory type based thereupon.

Despite determining that the data is to be written to the asymmetric memory component of the main memory within the computer system, the memory controller configures a memory table to associate the data with a physical address within a symmetric memory component of the main memory (i.e., instead of the asymmetric memory component of the main memory within the computer system) (730). The memory controller may request an indication and identification of free memory from the operating system, and receive a physical address associated with the symmetric memory component from the operating system in response.

The memory controller then writes, using a random access write operation, the data to the physical address for the symmetric memory component of the main memory within the computer system (740). For example, the memory controller may write the data to a DRAM physical memory address.

The exact write operation that is performed may depend on the structure of the memory system, the level of granularity supported by the memory table, the level of granularity supported by the different components within the memory system, and the type of read and write operations supported by the memory controller.

For example, where the memory table and/or asymmetric memory components do not support word level access to data stored in asymmetric memory, and instead only support page level access, writing data to symmetric memory also may include reading data from a page of asymmetric memory that is otherwise implicated by the data write, and writing at least some of that data to portion of the symmetric memory to which the data is written. Alternatively, if the memory table supports granular (e.g., word level) reads to asymmetric memory, writing word level data to symmetric memory may not require other words within the implicated asymmetric page or sector to be written to the symmetric memory component.

The memory controller configures a memory map to map the physical address of the symmetric memory component to which the data is written to a first virtual address (750). That is, the memory controller may configure the memory table to associate the first virtual address with a DRAM physical memory address.

At some point after the data has been written to the symmetric memory component, the memory controller receives a first read request (760). Receiving the first read request may include receiving a random access read request or a block read request.

Based on the memory table, the memory controller determines that the first read request is associated with the first virtual address that is mapped to the symmetric memory component of the main memory within the computer system (770). The memory controller queries the memory table with the first virtual address and identifies a physical address for the symmetric memory component.

In satisfaction of the first read request, and based on determining that the first read request is associated with the first virtual address that is mapped to the symmetric memory component of the main memory within the computer system, the memory controller enables access to the data associated with virtual address within the symmetric memory component of the main memory within the computer system (780). That is, the memory controller retrieves the data from symmetric memory. The application then may use the data in one or more functions (not shown).

Figure 8:
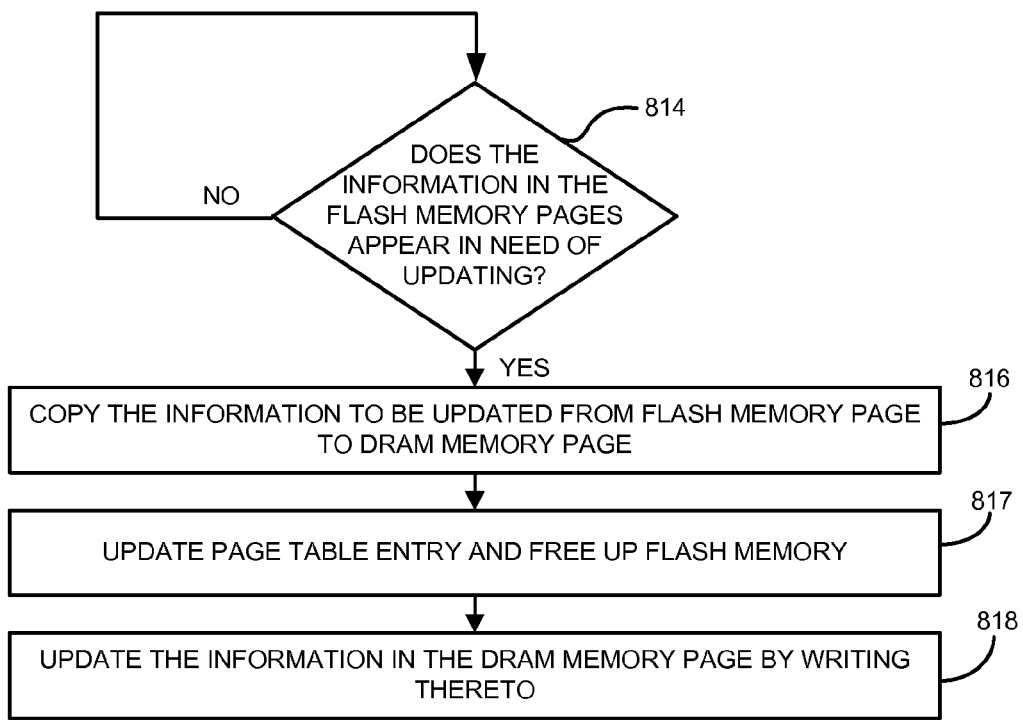
FIG. 8 is a flow chart of a method of managing a memory system.

Referring now to FIG. 8, a flow chart 800 illustrates a method of managing a hybrid main memory that includes flash memory. Generally, the operations flow chart 800 relate to a memory controller that is managing a hybrid memory system with flash (e.g., NOR flash) and DRAM components, where some data has been loaded to NOR flash and some storage is available in DRAM.

At process 812, the system determines whether flash memory pages need to be updated or re-written. For example, the computer system may collect usage statistics to confirm that migrated pages continue to be accessed, and thus should continue to be maintained in the asymmetric memory component. In one particular implementation, the computer system may be configured to determine whether pages in flash continue to be read more than a threshold number of times in order to remain in asymmetric memory.

At process 814, the system determines if there is information in one or more flash memory pages that needs to be updated. If there is no information that needs to be updated in flash memory, the process loops back to process 812 and continues to analyze the statistical use of data stored in the flash memory pages. If there is information in a page of flash memory that requires updating, the updated data is loaded to DRAM memory for updating starting at process 816.

At process 816, the one or more pages of information in the flash memory of the hybrid main memory that are to be updated are respectively copied from the flash memory into one or more DRAM memory pages.

Then, at process 817, the page table entries in the page table are updated to point to the physical address of the one or more DRAM memory pages that include the information that is to be updated. Additionally, the one or more pages of flash memory holding the information to be updated are freed up so that they may be used to store other information.

Next, at process 818, the data designated for updating information stored in the one or more DRAM memory pages is updated by writing the new information respectively into the one or more DRAM memory pages.

Figure 9:
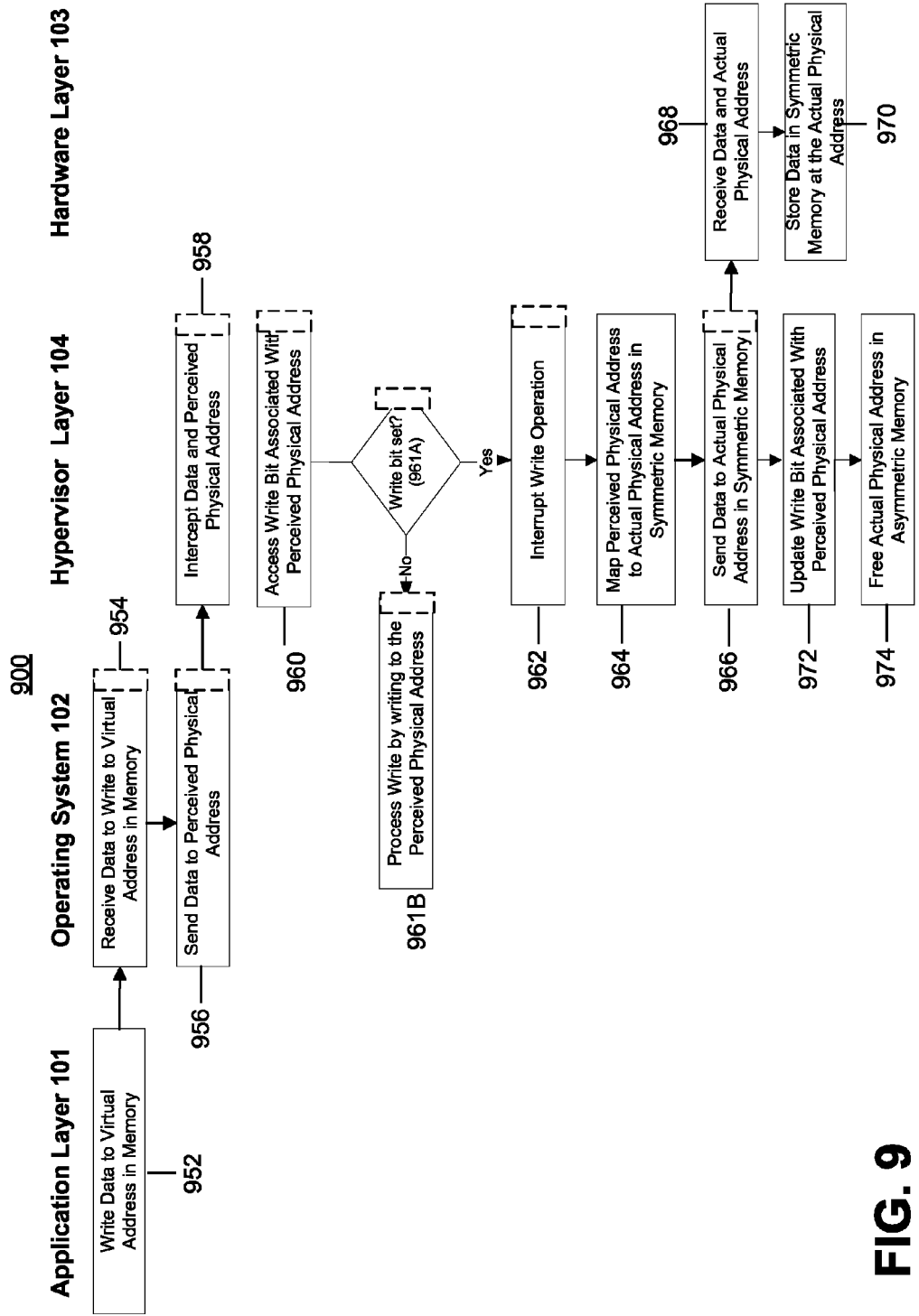
FIG. 9 is a flow chart of a process by which a hypervisor interrupts write operations.

FIG. 9 is a flow chart 900 of a process by which a hypervisor interrupts write operations. Note that although operations are described as being performed using a hypervisor operating at the hypervisor layer 104, the hypervisor may be implemented using software, hardware and/or a combination of hardware and software. For example, the hypervisor may be implemented as a software controller that interfaces with hardware circuits. The hardware circuits may trigger interrupts and provide software visibility into how the hybrid memory system is being used. In another implementation of a hypervisor where the inspection of the write including translation into perceived physical address, checking of the protection bit, and stopping the write is done by the CPU hardware using the MMU, control may be passed to the hypervisor layer via the trap handler, which gets invoked when an access that violates the write protection bit is encountered.

Initially, the application layer 101 writes data to a virtual address in memory (952). The operating system 102 receives the data to write to the virtual address in memory (954) and sends the data to the perceived physical address, which may include a memory-management unit-specified physical address (956).

The hypervisor layer 104 intercepts the data and the perceived physical address (958). Various configurations enable such interception. By way of example, the hypervisor layer 104 may be configured to interface with logic that monitors the exchange of information between the CPU and the memory systems. For example, the hypervisor layer 104 may be configured to inspect all writes from the CPU.

The hypervisor layer 104 accesses a write bit associated with the perceived physical address (960), and determines if the write bit has been configured to indicate whether write operations may be performed (961A). If the write bit has not been set, the hypervisor layer 104 processes the write by writing to the perceived physical address (961B). If the write bit is set to indicate that the perceived physical address is presently associated with asymmetric memory, and thus, unable to support write operations, the hypervisor layer 104 interrupts the write operation (962). For example, the hypervisor layer 104 may stop the write operation and direct that the write be executed in a different manner. More precisely, the hypervisor layer 104 stops the write, identifies a physical address for free space in symmetric memory, and associates the perceived physical address with the physical address of free space in symmetric memory. The hypervisor layer 104 then updates the address for the perceived physical address with the physical address of the free space in symmetric memory.

The hypervisor layer 104 sends data to the physical address in symmetric memory (966). The hardware layer 103 receives the data and the actual physical address (968) and stores the data in symmetric memory at the actual physical address (970). The hypervisor layer 104 then updates the write bit associated with the perceived physical address (972) and frees the actual physical address in asymmetric memory (974).

Figure 10:
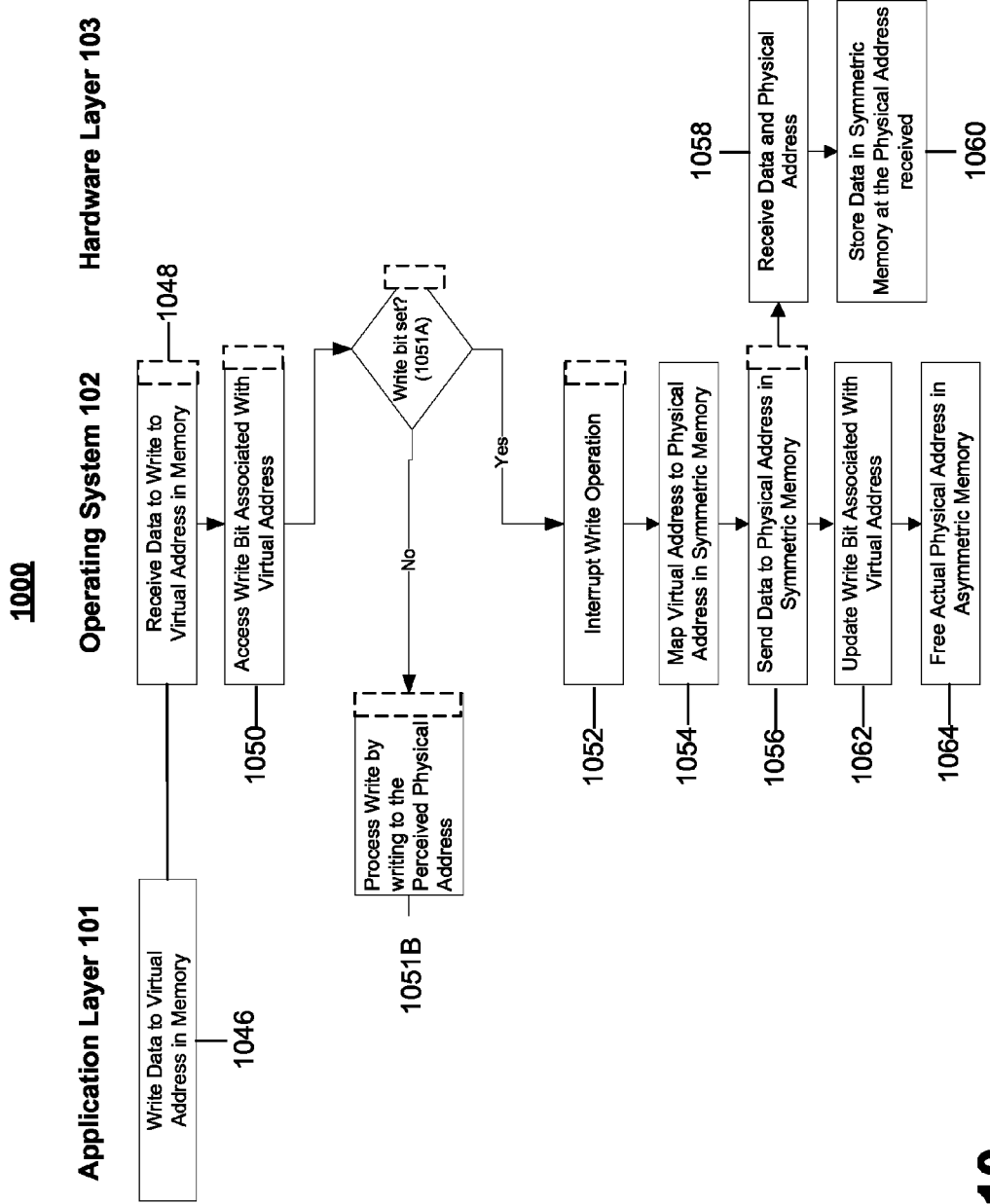
FIG. 10 is a flow chart of a process by which the hardware layer interrupts write operations using a trap.

FIG. 10 is a flow chart 1000 of a process by which the hardware layer interrupts write operations. Initially, the application layer 101 writes data to a virtual address in memory (1046). For example, the application layer 101 may replace an old record stored in the hybrid main memory with a new record.

The operating system 102 receives data to write to the virtual address in memory (1048), and accesses a write bit associated with the virtual address (1050). More precisely, the operating system receives the command from the application to write to a virtual address. The operating system 102 then accesses a page table and determines if a write bit for a page table entry has been set with a flag indicating that data should not be written to the current address (1051A). If not, the operating system 102 processes the write by writing to the perceived physical address (1051B). Because investigation of write operations may be implemented in hardware, operation 1051A is depicted as being performed by both the operating system 102 and hardware layer 103. For example, detection of a write bit may be performed using the hardware layer 103, while the triggered response to the interrupt may be performed by the operating system 102.

If the write bit has been set to indicate that data should not be written to the current address, the hardware layer 103, working together with the operating system 102 interrupts the write operation (1052). Interrupting the write operation includes stopping a write from being performed using the physical memory address for the asymmetric memory. The operating system 102 then may access a pointer to free space in symmetric memory, and use it as a pointer (e.g., a reference to a physical address for symmetric memory) to support the write operations. The operating system 102 then maps the virtual address to a physical address in symmetric memory (1054). Put differently, the pointer to free space in symmetric memory is associated with the virtual address, such that the operating system 102 sends the data to the physical address in symmetric memory (1056). More precisely, the operating system 102 retrieves the newly-allocated free space referenced by a physical address for symmetric memory, and sends the data to newly-allocated free space in asymmetric memory. The hardware layer 103 receives the data and the physical address (1058) and stores the data in symmetric memory at the received physical address (1060).

The operating system 102 updates the write bit associated with the virtual address (1062) and frees the actual physical address in asymmetric memory (1064). More precisely, the operating system 102 indicates that the virtual address now supports writes. In addition, if the data previously stored in the asymmetric memory component is replaced fully by this operation, the operating system 102 indicates that the previously-used address in asymmetric memory is no longer in use.

Although a number of operations were described as being performed using software and/or hardware operations in FIG. 9, operations 954, 956, 958, 960, 961A, 961B, 962, 966 1004, 1006, and 1008 have been modified with a special graphical designator (e.g., a box with a dotted line) to reflect the optional close integration with the hardware layer 103 that may be performed. Operations 1048, 1050, 1051A, 1051B, 1052, and 1056 in FIG. 10 have been similarly designated to identify those operations that may be performed based on close integration with the hardware layer 103.

FIGS. 11A and 11B are block diagrams 1100 of two configurations, 1110 and 1120, of a memory table that indicate how data is written to a virtual address that is associated with an asymmetric memory component. In particular, configuration 1110 illustrates how a read operation is processed before the memory controller identifies a write operation as mapping a virtual address to an asymmetric memory component. The memory controller then responds by using configuration 1120.

Initially, configuration 1110 illustrates an application that is configured to map data1 (content) to virtualaddress1 (e.g., 11000). In response to receiving virtualaddress1 from the application, the page table identifies virtualaddress1 as being associated with physicaladdress1 (e.g., 01000). However, as seen in the asymmetric component, physicaladdress1 (e.g., 01000) is associated with the asymmetric memory component, and thus, not suitable for supporting write operations without causing the undesirable system issues noted previously. The association of virtualaddress1 (e.g., 11000) with the asymmetric memory component can be determined in one of several ways. First, the memory controller may be configured to inspect a portion of physicaladdress1 (e.g., the 01 in 01000) to identify the physical address as being associated with the asymmetric memory component. Alternatively, or in addition, the page table includes a column indicating that virtualaddress1 is write protected.

As a result, the memory controller reconfigures the page table to use configuration 1120. More precisely, the memory controller receives a physical address (physicaladdress2 (e.g., 02000)) for the symmetric memory component and configures the page table to associate virtualaddress1 (e.g., 11000) with physicaladdress2 (e.g., 02000). Having received physicaladdress2 (e.g., 02000) in response to its translation query, the memory management unit within the CPU then is configured to write data1 to physicaladdress2 (e.g., 02000). Data1 then is stored at physicaladdress2 (e.g., 02000) in the symmetric memory component.

Figure 12:
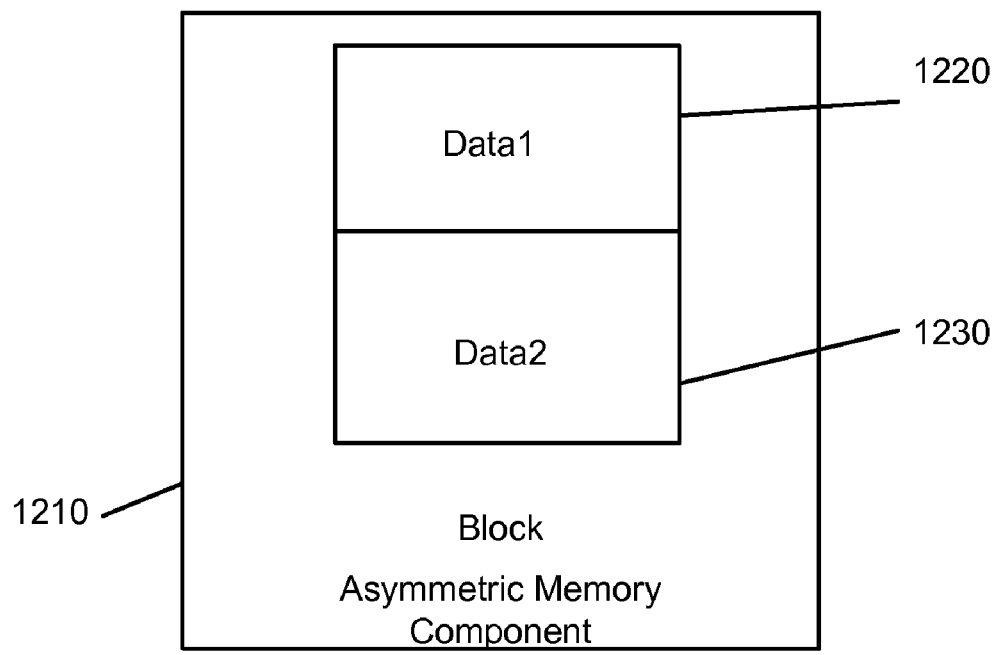
FIG. 12 is a block diagram of a configuration for an asymmetric memory component that has first data stored in a different page than second data.
Figure 13:
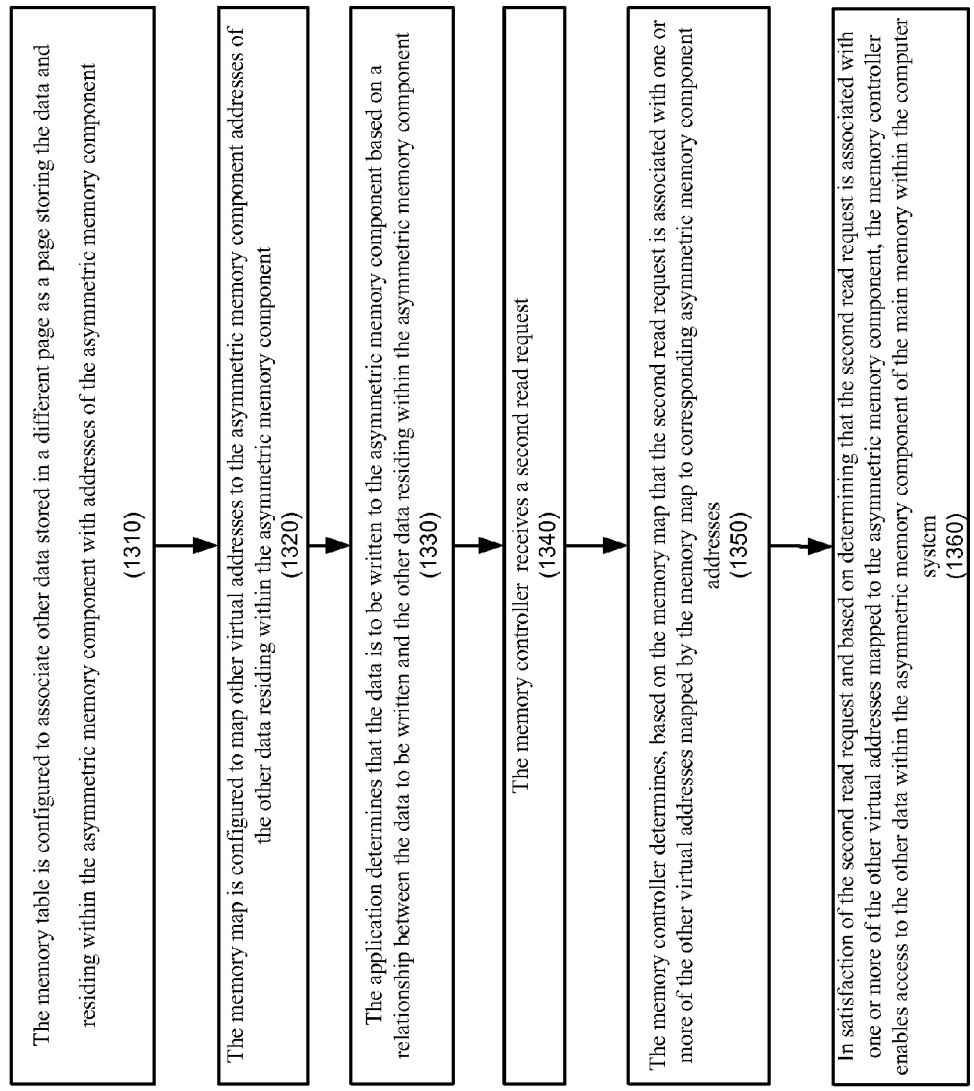
FIG. 13 is a flow chart of a process by which a computer system processes read and write commands to an asymmetric memory component that has first data stored in a first page and second data stored in a second page.

FIGS. 12 and 13 illustrate a configuration and process by which a memory controller processes writes to an asymmetric memory component where first data is stored in a first page and second data is stored in a second page. FIG. 12 is a block diagram 1200 of a configuration for an asymmetric memory component that has first data stored in a different page than second data. In particular, block diagram 1200 illustrates two entries (data1 and data2) that are stored within the same block of asymmetric memory. Executing a write to any address within the asymmetric block may cause undesirable behavior (e.g., corrupt data, timing problems). In a configuration where the memory table and/or the asymmetric component is only able to provide page level access in 4 Kilobyte pages and each 4 Kilobyte page includes multiple entries, data1 and the other entries in the containing 4 Kilobyte page are moved, in response to detecting a write to the physical address associated with the asymmetric memory component, from the asymmetric memory component to the symmetric memory component. Since data2 is stored in a different page than data1, the migration of data1 from an asymmetric memory component to a symmetric memory component does not impact an ability of the CPU to read data2.

FIG. 13 is a flow chart 1300 of a process by which a computer system processes write commands to an asymmetric memory component that has first data loaded to a first page and second data loaded to second page. That is, flow chart 1300 illustrates a process by which the memory controller manages access to the data configured in the manner shown in FIG. 12. Initially, the memory table is configured to associate other data stored in a different page as a page storing the data and residing within the asymmetric memory component with addresses of the asymmetric memory component (1310). The memory map is configured to map other virtual addresses to the asymmetric memory component addresses of the other data residing within the asymmetric memory component (1320). Put differently, the memory table indicates that first data is stored in a first page of the asymmetric memory component and that second data is stored in a second page of the asymmetric memory component.

The application determines that the data is to be written to the asymmetric memory component based on a relationship between the data to be written and the other data residing within the asymmetric memory component (1330). For example, an agent may determine that the data being written is part of a larger record that has been loaded to the asymmetric memory component. As result, the agent determines that the data should be stored in a manner similar to the other data based on a determination that access to a first part of a larger record indicates that a second part of the record is likely to be accessed.

The memory controller then receives a second read request (1340). The memory controller determines, based on the memory map that the second read request is associated with one or more of the other virtual addresses mapped by the memory map to corresponding asymmetric memory component addresses (1350).

In satisfaction of the second read request and based on determining that the second read request is associated with one or more of the other virtual addresses mapped to the asymmetric memory component, the memory controller enables access to the other data within the asymmetric memory component of the main memory within the computer system (1360). That is, even though the data in the first page of asymmetric memory has been written to symmetric memory, the memory controller enables continued access to the second page still residing in asymmetric memory.

Figure 14:
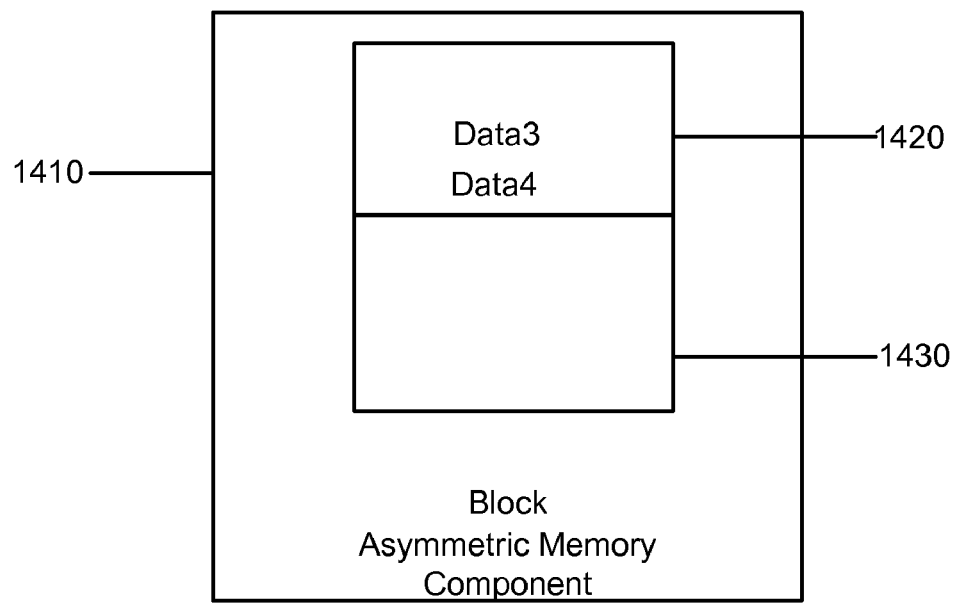
FIG. 14 is a block diagram of a configuration for an asymmetric memory component that has first data and second data stored in the same page.

In contrast to FIGS. 12 and 13, where the ability to read other data in a different page is not impacted by executing a write to a virtual address associated with data in a first page, FIG. 14 provides a block diagram 1400 describing a configuration for an asymmetric memory component that has third and fourth data stored in a same page. As shown, the data3 and data4 have been loaded to the same page, page 1420 within block 1410. Page 1430 remains empty, though it may have other data.

FIG. 15 is a flow chart of a process by which a computer system processes write commands to an asymmetric memory component that has first data and second data loaded to the same page. Initially, the memory table is configured to associate other data stored in a same page as the data and residing within the asymmetric memory component with physical addresses of the asymmetric memory component (1510). In a memory controller and/or memory component that only permits page-level access, the first data and the second data cannot be stored in separate locations so long as both the first data and the second data are stored in the same pages.

The memory controller determines that the data is to be written in the symmetric memory component based on a relationship between the data to be written and the other data residing within the asymmetric memory component (1520). In one example, determining that the data is to be written in the symmetric memory component based on a relationship between the data to be written and the other data includes determining that the data is related to the other data and determining that the other data should be stored in symmetric memory.

The memory controller writes the other data to the symmetric memory component of the main memory within the computer system (1530). For example, a page from NOR flash may be read and loaded to DRAM.

The memory map is configured to map other virtual addresses associated with the other data to the symmetric memory component addresses data residing within the asymmetric memory component (1540). The other virtual addresses associated with the second data are associated with symmetric memory physical addresses.

A second read request is received (1550). Based on the memory map, the memory controller determines that the second read request is associated with the one or more of the other virtual addresses mapped by the memory map to corresponding symmetric memory component addresses (1560). The memory controller may determine that the second read request is associated with physical addresses that map to DRAM. In satisfaction of the second read request and based on determining that the second read request is associated with one or more of the other virtual addresses mapped to the symmetric memory component, the memory controller enables access to the other data within the symmetric memory component of the main memory within the computer system (1570).

Figure 16:
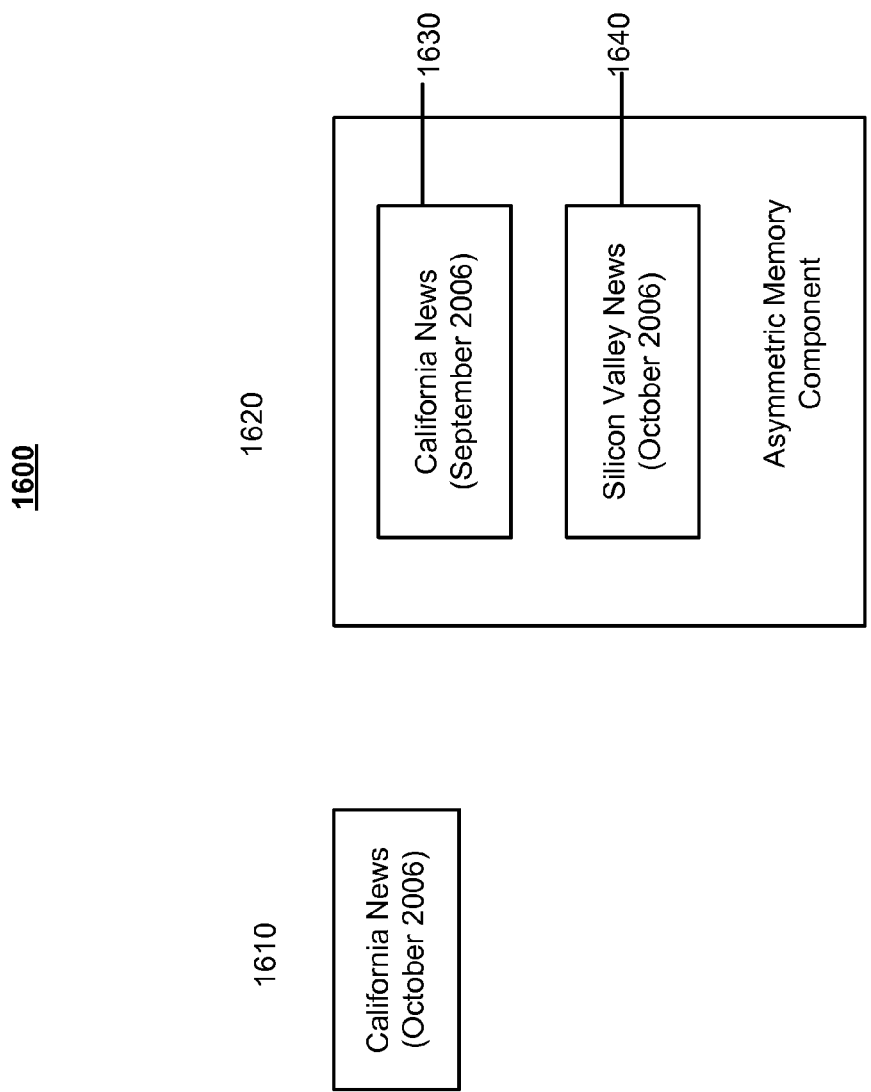
FIG. 16 is a block diagram of a configuration for a memory system in which the data to be written is an update to the data stored in asymmetric memory.

FIG. 16 is a block diagram 1600 of a configuration for a memory system where the data to be written is an update to the data stored in asymmetric memory. In particular, block diagram 1600 illustrates that a memory controller may determine that the data is an update to data stored in the asymmetric memory component of the main memory within the computer system. As a result, the memory controller writes the data to the physical address within the symmetric memory component of the main memory within the computer, despite determining that the data is the update to data stored in the asymmetric memory component of the main memory within the computer system.

As shown, data 1610 includes data involved in a write command. Data 1610 relates to California news from October 2006. Because of the relationship between data 1610 and entry 1630 in the asymmetric memory component 1620, where entry 1630 represents an older instance (California News, September 2006), an application attempts to replace entry 1630 with data 1610 using a write command since data 1610 is an update to the already stored content. And although slightly different than entry 1630, the similarity between the content in the data 1610 and the content in entry 1640 also may be used to determine that the data 1610 should be loaded to the asymmetric memory component. However, because entry 1630 is stored in the asymmetric memory component, the memory controller may be configured to interrupt the write into the physical address stored in the asymmetric memory component 1620. As a result, the memory controller is configured to write the data 1620 to a symmetric memory component.

Figure 17:
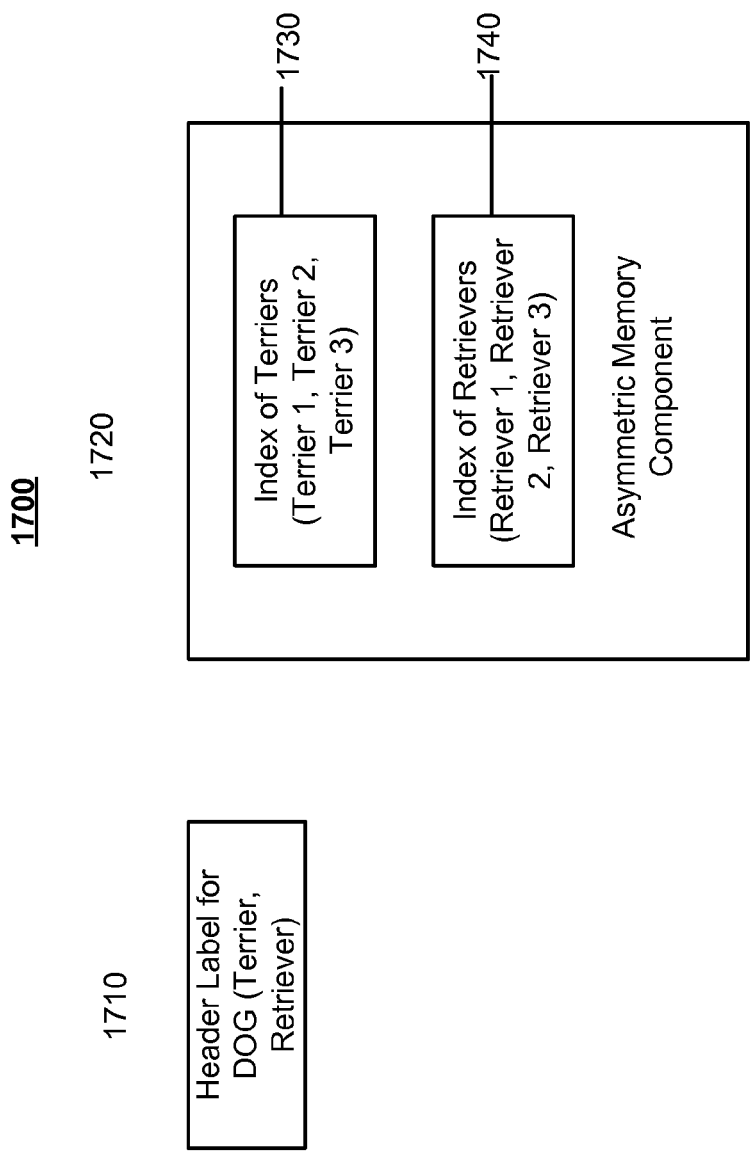
FIG. 17 is a block diagram of a configuration for a memory system in which the data to be written in the asymmetric memory component is related to other data within the asymmetric memory component.

FIG. 17 is a block diagram 1700 of a configuration for a memory system where the data to be written in the asymmetric memory component is related to other data within the asymmetric memory component. Block diagram 1700 illustrates how an agent determines that the data is to be written in the asymmetric memory component based on the relationship between the data to be written and the other data residing within the asymmetric memory component. More precisely, block diagram 1700 determines that the data 1710 includes a header label within the application and the other data includes entries 1730 and 1740 referenced by the header label.

Data 1710 represents a header label related to the subject matter 'dog'. The header label includes an indication that 'dog' includes constituent topics 'terrier' and 'retriever.' Generally, the header label represents a description of a data structure so that an application may inspect the header label to determine if the remainder of the record should be retrieved for the application. Thus, an application seeking content related to 'poodle' may inspect the header label to determine that no additional retrieval of the record is required.

Because the data 1710 is related to entries 1730 and 1740 stored in the asymmetric memory component 1720, an agent storing data 1710 may use the relationship between the header label and the entries referenced by the header label to determine that the data 1710 should be written to the asymmetric memory component. However, because the entries 1730 and 1740 are stored in the asymmetric memory component 1730, the write may be interrupted. The data 1710 then is written to the symmetric memory component (not shown). In one configuration, where the data 1610 and entries 1630 and 1640 are identified as belonging to the same page, entries 1630 and 1640 are written to a symmetric memory component.

Figure 18:
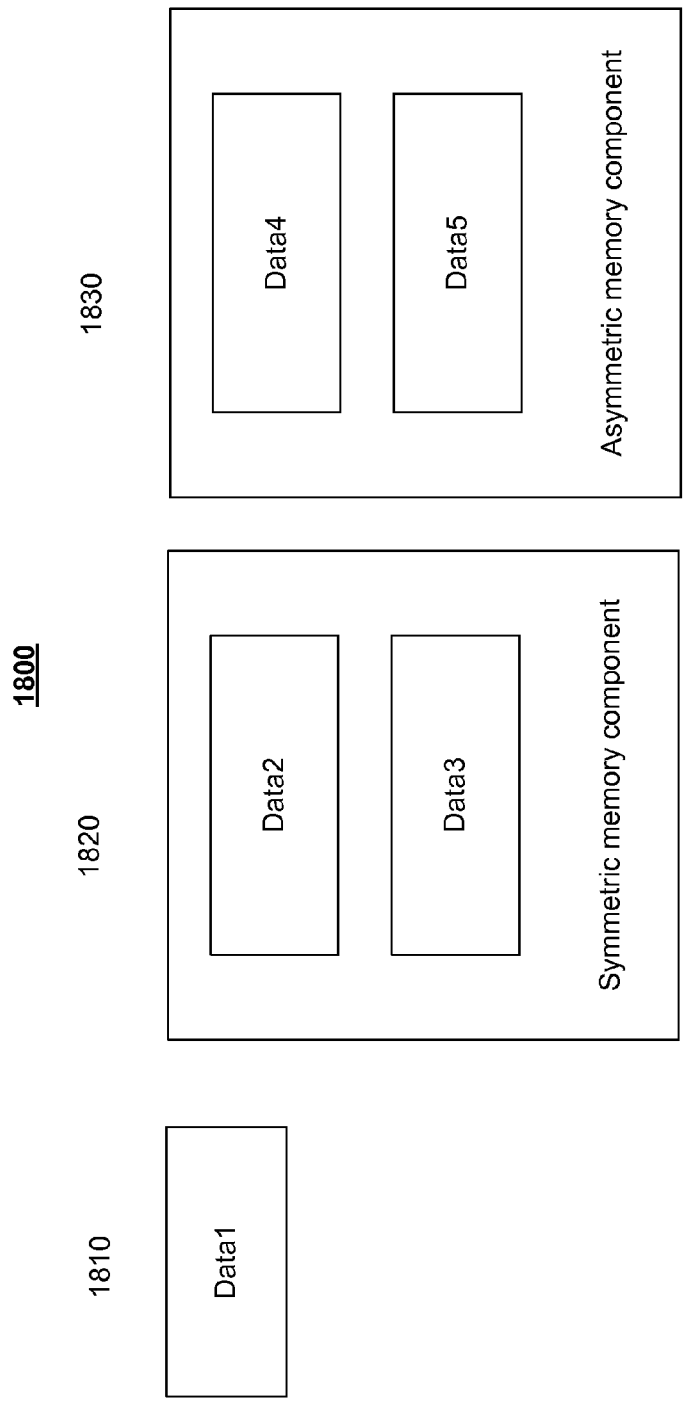
FIG. 18 is a block diagram of a configuration for a memory system that relates the access characteristics of the data to be written to the access characteristics of symmetric memory and asymmetric memory.

FIG. 18 is a block diagram of a configuration 1800 for a memory system that relates the access characteristics of the data to be written to the access characteristics of symmetric memory and asymmetric memory. The configuration 1800 is used to determine that the data 1810 has access characteristics more consistent with the asymmetric memory component 1830 than the symmetric memory component 1820. Notwithstanding a determination that the data has the access characteristics more consistent with the asymmetric memory component than the symmetric memory component, the memory controller writes the data to the physical address within the symmetric memory component of the main memory within the computer system.

In particular, configuration 1800 includes data 1810 with contents data1. Symmetric memory component 1820 includes contents data2 and data3. Asymmetric memory component 1830 includes content data4 and data5. In determining where to store data 1810, a memory controller may be configured to compare the access characteristics of data 1810 with the access characteristics of the entries with data2 and data3 in the symmetric memory component 1820. The memory controller also may be configured to compare the access characteristics of data 1810 with the access characteristics of the entries with data4 and data5 in the asymmetric memory component 1850. Even though the access characteristics for data 1810 indicate that data 1810 should be stored in with the entries data4 and data5 in the asymmetric memory component 1830, the memory controller may be configured to interrupt the write instruction. The memory controller instead configures the data 1810 to be loaded to the symmetric memory component 1830.

Other implementations are within the scope of the claims. For example, although certain operations were described using certain systems, such as a hypervisor layer, other systems may be configured to perform the operations.

In another example, other useful implementations could be achieved if operations of the disclosed techniques were performed in a different order and/or if components in the disclosed systems were combined in a different manner and/or replaced or supplemented by other components. Accordingly, other implementations are within the scope of the following claims.

Although one or more operations are described as being performed by a particular agent, such as a memory controller, the agent may be configured to operate within one or more components within the computer system. For example, the memory controller may be configured to operate within the operating system, the hypervisor layer and/or an intermediary component. Alternatively, the memory controller may be configured to operate in a distributed manner.

What is claimed is:
1. A method of managing a memory system that has multiple parts including at least a first part of the memory system and a second part of the memory system, the first part of the memory system being different from the second part of the memory system in that the first part of the memory system has different access characteristics than the second part of the memory system or the first part of the memory system is used for a different type of memory-dependent operation than the second part of the memory system, the method comprising:

receiving a command from an application to write data to the memory system;

determining that the data is to be written to the second part of the memory system based on the command from the application;

despite determining that the data is to be written to the second part of the memory system based on the command from the application:

configuring a memory table to associate the data with a physical address within the first part of the memory system instead of the second part of the memory system, writing the data to the physical address within the first part of the memory system, and configuring a memory map to map the physical address within the first part of the memory system to which the data is written to a first virtual address;

receiving a first read request for the data;

determining, based on the memory map, that the first read request is associated with the first virtual address that is mapped to the physical address within the first part of the memory system; and in satisfaction of the first read request, and based on determining that the first read request is associated with the first virtual address that is mapped to the physical address within the first part of the memory system, enabling access to the data at the physical address within the first part of the memory system.

2. The method of claim 1, wherein the first part of the memory system is a symmetric memory component and the second part of the memory system is an asymmetric memory component.

3. The method of claim 1, wherein the first part of the memory system is a volatile memory component and the second part of the memory system is a non-volatile memory component.

4. The method of claim 1, wherein the first part of the memory system is a dynamic random access memory component and the second part of the memory system is a flash memory component.

5. The method of claim 1, wherein the first part of the memory system has first absolute read and write speeds that are faster than second absolute read and write speeds of the second part of the memory system and a first difference between write speed and read speed of the first part of the memory system is less than a second difference between write speed and read speed of the second part of the memory system.

6. The method of claim 1, wherein the first part of the memory system has different access characteristics than the second part of the memory system.

7. The method of claim 1, wherein the first part of the memory system is used for a different type of memory-dependent operation than the second part of the memory system.

8. The method of claim 1, wherein receiving the command from the application includes receiving a command to write to a second virtual address, further comprising:

detecting a write protection parameter for the second virtual address; and using the write protection parameter to configure the memory table to associate the data with a physical address within the first part of the memory system instead of the second part of the memory system.

9. The method of claim 1, further comprising:

configuring the memory table to associate, with physical addresses of the second part of the memory system, other data stored in a same page as the data and residing within the second part of the memory system;

determining that the data is to be written in the first part of the memory system based on a relationship between the data and the other data residing within the second part of the memory system;

writing the other data to the first part of the memory system;

configuring the memory map to map other virtual addresses associated with the other data to the first part of the memory system;

receiving a second read request;

determining, based on the memory map, that the second read request is associated with one or more of the other virtual addresses mapped by the memory map to corresponding addresses in the first part of the memory system; and in satisfaction of the second read request and based on determining that the second read request is associated with one or more of the other virtual addresses mapped to the first part of the memory system, enabling access to the other data within the first part of the memory system.

10. The method of claim 1, further comprising:

determining that the data has access characteristics more consistent with the second part of the memory system than the first part of the memory system; and determining to write the data to the physical address within the first part of the memory system, despite determining that the data has access characteristics more consistent with the second part of the memory system than the first part of the memory system.

11. The method of claim 1, further comprising:

maintaining, within an operating system, a page table that maps a virtual address accessed by the application with a physical address associated with either the first part of the memory system or the second part of the memory system;

receiving, on a central processing unit (CPU), the command from the application to write the data to the virtual address accessed by the application;

using the operating system to receive an allocation of memory from within the first part of the memory system;

using the operating system to write the data to the allocated memory from within the first part of the memory system; and configuring the page table to associate the virtual address accessed by the application with a physical address for the allocated memory within the first part of the memory system.

12. The method of claim 1, further comprising:

maintaining, using a hypervisor, a shadow page table that maps a virtual address accessed by the application with a physical address associated with either the first part of the memory system or the second part of the memory system;

receiving, on a CPU, the command to write the data associated with the virtual address accessed by the application;

inspecting an entry for the virtual address accessed by the application in the shadow page table;

detecting a write protection parameter associated with the virtual address accessed by the application;

identifying, using the hypervisor, an allocation of available memory in the first part of the memory system;

using the hypervisor to write the data to the allocated memory from within the first part of the memory system; and configuring, within the hypervisor, the shadow page table to associate the virtual address accessed by the application with a physical address for the allocated memory within the first part of the memory system.

13. The method of claim 1, further comprising:

receiving, from a CPU, a memory management unit-specified physical address that is processed by an intermediary component as the virtual address and is associated with the command to write;

providing the memory management unit-specified physical address to the memory map in the intermediary component;

using the memory map to determine that the memory management unit-specified physical address is associated with the second part of the memory system;

identifying, using the intermediary component, a physical address associated with available memory within the first part of the memory system;

associating, using the intermediary component, the physical address associated with the first part of the memory system with the memory management unit-specified physical address; and writing, using the intermediary component, the data to the physical address associated with the first part of the memory system.

14. A system comprising:

a memory system that has multiple parts including at least a first part of the memory system that is different from a second part of the memory system in that the first part of the memory system has different access characteristics than the second part of the memory system or the first part of the memory system is used for a different type of memory-dependent operation than the second part of the memory system; and a controller configured to perform operations comprising:

receiving a command from an application to write data to the memory system;

determining that the data is to be written to the second part of the memory system based on the command from the application;

despite determining that the data is to be written to the second part of the memory system based on the command from the application:

configuring a memory table to associate the data with a physical address within the first part of the memory system instead of the second part of the memory system, writing the data to the physical address within the first part of the memory system, and configuring a memory map to map the physical address within the first part of the memory system to which the data is written to a first virtual address;

receiving a first read request for the data;

determining, based on the memory map, that the first read request is associated with the first virtual address that is mapped to the physical address within the first part of the memory system; and in satisfaction of the first read request, and based on determining that the first read request is associated with the first virtual address that is mapped to the physical address within the first part of the memory system, enabling access to the data at the physical address within the first part of the memory system.

15. The system of claim 14, wherein the first part of the memory system is a symmetric memory component and the second part of the memory system is an asymmetric memory component.

16. The system of claim 14, wherein the first part of the memory system is a volatile memory component and the second part of the memory system is a non-volatile memory component.

17. The system of claim 14, wherein the first part of the memory system is a dynamic random access memory component and the second part of the memory system is a flash memory component.

18. The system of claim 14, wherein the first part of the memory system has first absolute read and write speeds that are faster than second absolute read and write speeds of the second part of the memory system and a first difference between write speed and read speed of the first part of the memory system is less than a second difference between write speed and read speed of the second part of the memory system.

19. The system of claim 14, wherein the first part of the memory system has different access characteristics than the second part of the memory system.

20. The system of claim 14, wherein the first part of the memory system is used for a different type of memory-dependent operation than the second part of the memory system.

* * * * *